United States Patent
Lee et al.

(10) Patent No.: US 11,361,521 B2
(45) Date of Patent: Jun. 14, 2022

(54) APPARATUS AND METHOD FOR PROVIDING ITEM ACCORDING TO ATTRIBUTE OF AVATAR

(71) Applicant: SAMSUNG ELECTRONICS CO., LTD., Suwon-si (KR)

(72) Inventors: Wooyong Lee, Suwon-si (KR);
Chanhee Yoon, Suwon-si (KR);
Chanmin Park, Suwon-si (KR);
Donghwan Seo, Suwon-si (KR);
Yonggyoo Kim, Suwon-si (KR);
Junyoung Park, Suwon-si (KR);
Jiyoon Park, Suwon-si (KR); Jungeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 16/535,364

(22) Filed: Aug. 8, 2019

(65) Prior Publication Data
US 2020/0051341 A1 Feb. 13, 2020

(30) Foreign Application Priority Data
Aug. 8, 2018 (KR) .................. 10-2018-0092656

(51) Int. Cl.
*G06T 19/20* (2011.01)
*G06T 13/40* (2011.01)

(52) U.S. Cl.
CPC ............ *G06T 19/20* (2013.01); *G06T 13/40* (2013.01); *G06T 2215/16* (2013.01); *G06T 2219/2004* (2013.01)

(58) Field of Classification Search
None
See application file for complete search history.

(56) References Cited

U.S. PATENT DOCUMENTS 9,800,657 B2 * 10/2017 Tagawa ............... H04L 67/1097
9,996,981 B1 6/2018 Tran et al.
(Continued)

FOREIGN PATENT DOCUMENTS

EP  2 293 221   4/2014
JP  2011-039570  2/2011
(Continued)

OTHER PUBLICATIONS

International Search Report dated Nov. 13, 2019 in counterpart International Patent Application No. PCT/KR2019/009922.
(Continued)

*Primary Examiner* — Saptarshi Mazumder
(74) *Attorney, Agent, or Firm* — Nixon & Vanderhye P.C.

(57) ABSTRACT

An electronic device is provided, which includes a camera; a display; and a processor, wherein the processor is configured to control the electronic device to: acquire an image of a user of the electronic device using the camera, generate an avatar corresponding to the user using the image, identify attribute information corresponding to the avatar using the image, identify at least one item corresponding to the attribute information among a plurality of items applicable to the avatar, and display the at least one item with the avatar through the display.

13 Claims, 21 Drawing Sheets

(56) References Cited

U.S. PATENT DOCUMENTS

| | | | |
|---|---|---|---|
| 2006/0184355 A1* | 8/2006 | Ballin | G06F 3/011 704/8 |
| 2008/0201638 A1* | 8/2008 | Nair | H04L 67/38 715/706 |
| 2011/0052081 A1 | 3/2011 | Onoe et al. | |
| 2013/0129210 A1* | 5/2013 | Na | G06Q 30/02 382/165 |
| 2013/0343615 A1* | 12/2013 | Zhang | G06K 9/00664 382/111 |
| 2015/0186977 A1* | 7/2015 | Leonard | G06Q 30/0631 705/26.7 |
| 2016/0092956 A1* | 3/2016 | Su | G06Q 30/0643 705/26.5 |
| 2016/0098851 A1 | 4/2016 | Wu et al. | |
| 2016/0217601 A1 | 7/2016 | Tsuda et al. | |
| 2016/0361653 A1 | 12/2016 | Zhang et al. | |
| 2017/0080346 A1* | 3/2017 | Abbas | A63F 13/79 |
| 2017/0286752 A1* | 10/2017 | Gusarov | G06T 13/40 |
| 2017/0300945 A1* | 10/2017 | Nigul | G06Q 30/0254 |
| 2018/0024726 A1 | 1/2018 | Hviding | |
| 2018/0025405 A1* | 1/2018 | Jones | G06Q 30/0631 705/26.7 |
| 2018/0091732 A1 | 3/2018 | Wilson et al. | |
| 2018/0113587 A1 | 4/2018 | Allen et al. | |
| 2018/0189998 A1 | 7/2018 | Tarquini et al. | |

FOREIGN PATENT DOCUMENTS

| | | |
|---|---|---|
| JP | 2016-136324 | 7/2016 |
| KR | 10-1028257 | 4/2011 |
| WO | 2018/057272 | 3/2018 |

OTHER PUBLICATIONS

Extended Search Report dated Dec. 5, 2019 in counterpart European Patent Application No. 19190848.2.

* cited by examiner

⟨610⟩

⟨620⟩

⟨660⟩

⟨670⟩

⟨680⟩

⟨710⟩

⟨720⟩

⟨730⟩

⟨740⟩

⟨750⟩

⟨770⟩

⟨1110⟩

⟨1120⟩

⟨1130⟩

1211

1213

1215

<1210>

1221

1223

1225

<1220>

⟨1230⟩

⟨1240⟩

⟨1250⟩

⟨1310⟩

⟨1320⟩

⟨1330⟩

APPARATUS AND METHOD FOR PROVIDING ITEM ACCORDING TO ATTRIBUTE OF AVATAR

CROSS-REFERENCE TO RELATED APPLICATION

This application is based on and claims priority under 35 U.S.C. § 119 to Korean Patent Application No. 10-2018-0092656, filed on Aug. 8, 2018, in the Korean Intellectual Property Office, the disclosure of which is incorporated by reference herein in its entirety.

BACKGROUND

Field

The disclosure relates to a method and an apparatus capable of providing at least one item by applying the item to an avatar in accordance with a user attribute.

Description of Related Art

Recently, with the development of digital technology, various types of electronic devices, such as a mobile communication terminal, a personal digital assistant (PDA), an electronic notebook, a smart phone, a tablet personal computer (PC), and a wearable device, have been widely used. In order to support and increase functions of such electronic devices, hardware parts and/or software parts of the electronic devices have been continuously improved.

Meanwhile, a user may share his/her own everyday experiences or may freely communicate with other people through online communities, such as social network services/sites (SNS) and messenger services. Further, a user prefers to have his/her own custom clothing and accessories in distinction from the other people, and such a phenomenon occurs in the same manner even in online. In order to meet such user's requirements, an electronic device makes and provides an avatar or an emoji that is like the user using a user image (e.g., selfie). For example, the electronic device may obtain a face model which is like the user among various shapes of predefined avatar face models and is selected by the user, or may apply eyes, a nose, and a mouth to the face model based on face feature points extracted from the user image. In addition, items, such as avatar's body shape, hair style, clothing, hat, and spectacles, may be directly selected by the user among predefined items and may be reflected in the avatar.

All humans have their own peculiar characteristics, such as hair color, hair style, pupil color, eye shape, eyebrows shape, nose shape, mouth shape, ear, skin tone, stature, human body proportions, and weight, and their own unique personalities. However, the electronic device is unable to reflect all user's own unique features, such as avatar shapes, facial expressions, hair styles, and clothing, which may differ by user's sex, age, human race, and region, in avatars.

SUMMARY

Various example embodiments of the disclosure provide a method and an apparatus for generating an avatar from an image photographed by a camera, identifying avatar attribute information using the generated avatar, and providing the avatar to which various items based on the avatar attribute information are applied.

According to various example embodiments, an electronic device may include: a camera; a display; and a processor, wherein the processor is configured to control the electronic device to: acquire an image of a user of the electronic device using the camera, generate an avatar corresponding to the user using the image, identify attribute information corresponding to the avatar using the image, identify at least one item corresponding to the attribute information among a plurality of items applicable to the avatar, and display the at least one item with the avatar through the display.

According to various example embodiments, a method for operating an electronic device may include: acquiring an image of a user of the electronic device using a camera included in the electronic device; generating an avatar corresponding to the user using the image; identifying attribute information corresponding to the avatar using the image; identifying at least one item corresponding to the attribute information among a plurality of items applicable to the avatar; and displaying the at least one item with the avatar through a display of the electronic device.

According to various example embodiments, an electronic device may include a display; and a processor, wherein the processor is configured to control the electronic device to: determine a user attribute from an image including a user of the electronic device, generate an avatar based on the determined user attribute and display the generated avatar through the display, determine at least one item to be applied to the avatar based on the user attribute, and display the avatar to which the at least one item is applied through the display.

According to the various example embodiments, the user attribute corresponding, for example, and without limitation, to the user's sex, age, human race, region, or the like, may be analyzed from the user image photographed by the camera, and the avatar corresponding to the analyzed user attribute is generated. Accordingly, various items can be applied to the avatar based on the user attribute.

According to the various example embodiments, the avatar is generated reflecting the user's own unique characteristics, and the item in consideration of the user characteristics is applied to the avatar. Accordingly, it is possible to provide the user's own unique avatar in distinction from the other people.

According to the various example embodiments, it is possible to provide an item capable of indicating, for example, regional distinctive features or to provide an item capable of being used for a specific event period.

According to the various example embodiments, it is possible to provide emoji (or sticker) differently expressing (or indicating) the emotional expression (or facial expression), operation, and background in accordance with the age, sex, human race, or region.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
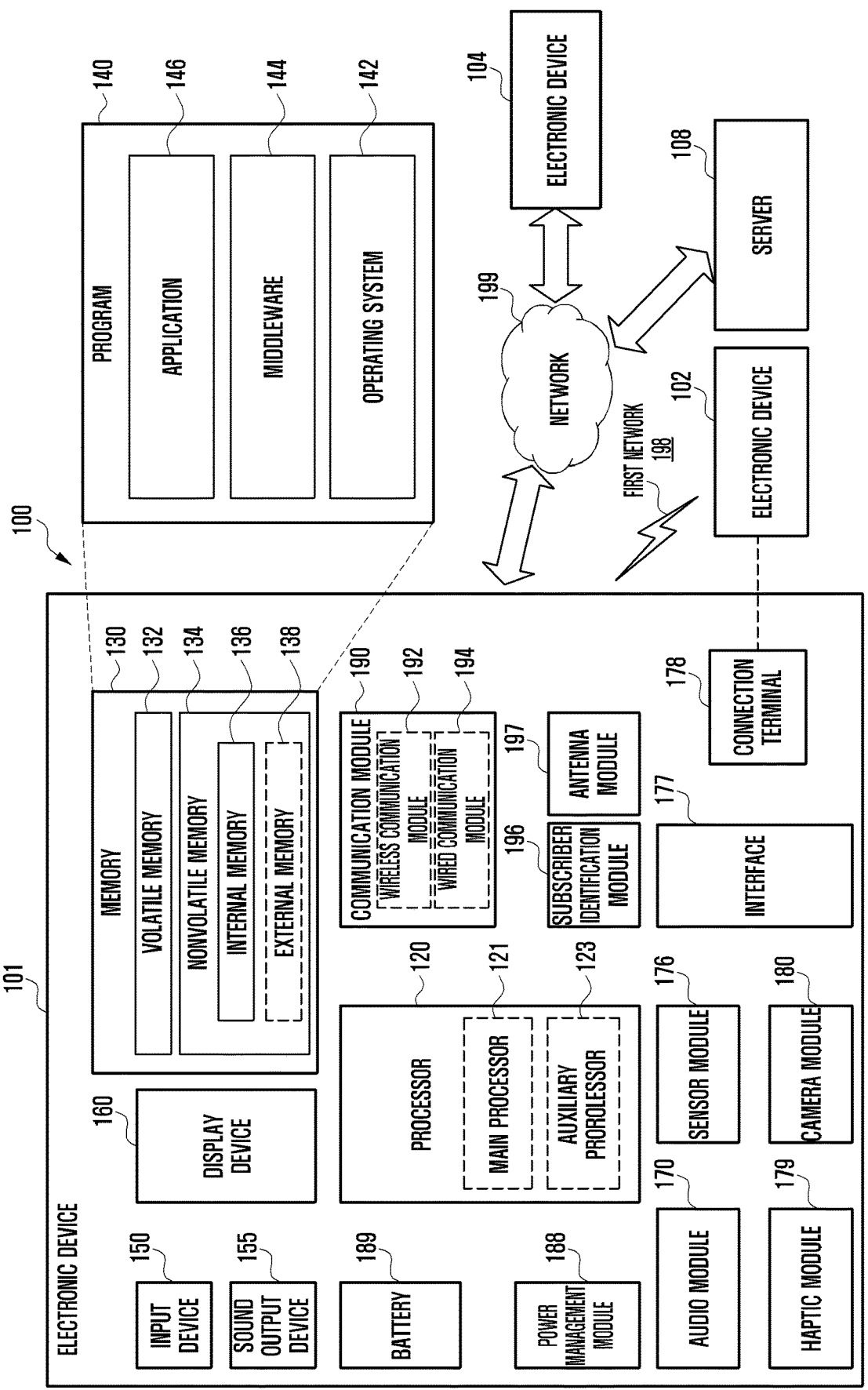
FIG. 1 is a block diagram illustrating an example electronic device in a network environment according to various embodiments.

The electronic device according to various example embodiments may be one of various types of electronic devices. The electronic devices may include, for example, and without limitation, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
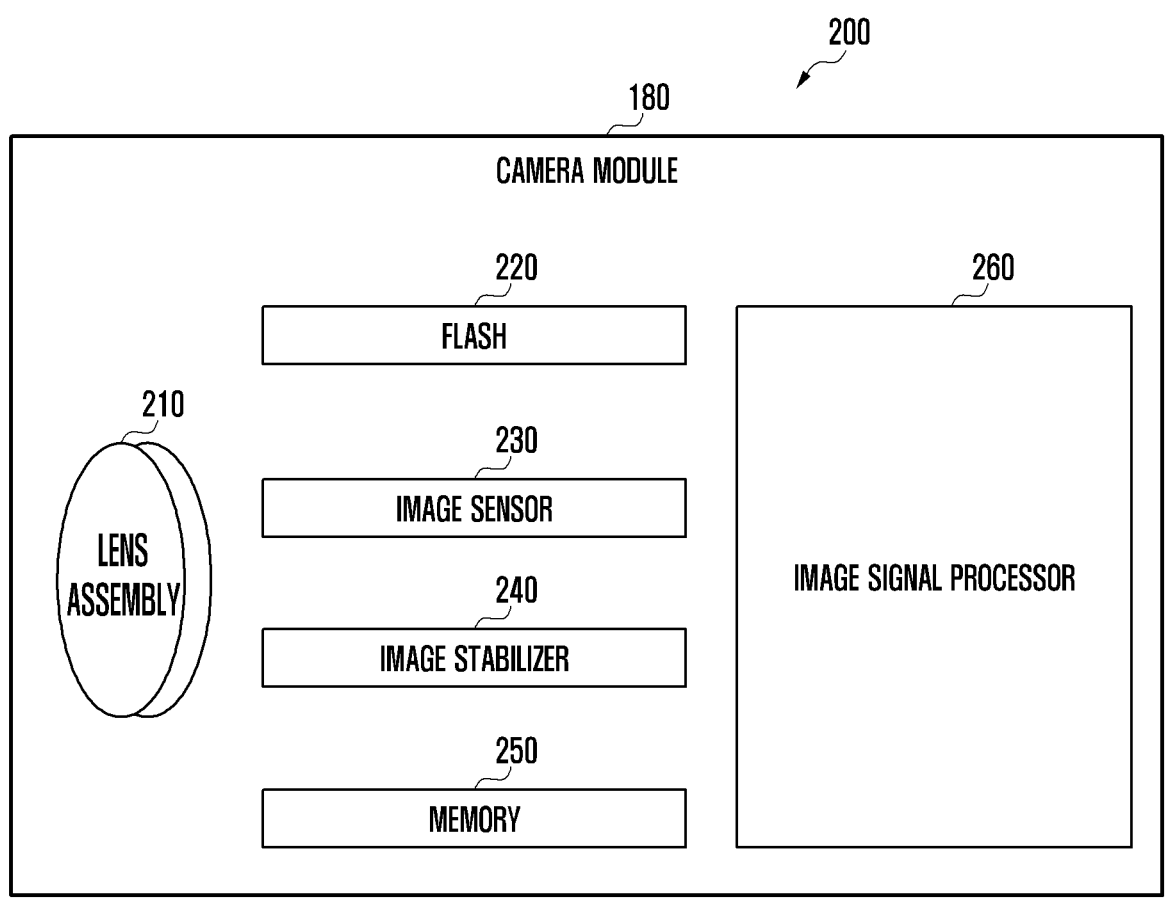
FIG. 2 is a block diagram illustrating an example camera module according to various embodiments.

FIG. 2 is a block diagram 200 illustrating an example camera module 180 according to various embodiments.

Referring to FIG. 2, the camera module 180 may include a lens assembly 210, a flash 220, an image sensor 230, an image stabilizer (e.g., including image stabilizing circuitry) 240, memory 250 (e.g., buffer memory), and/or an image signal processor (e.g., including image signal processing circuitry) 260.

The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, and without limitation, a dual camera, a 360-degree camera, a spherical camera, or the like. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens, a telephoto lens, or the like.

The flash 220 may emit light that is used to reinforce light reflected from an object. According to an embodiment, the flash 220 may include, for example, and without limitation, one or more light emitting diodes (LEDs) (e.g., a red-green-blue (RGB) LED, a white LED, an infrared (IR) LED, an ultraviolet (UV) LED, etc.), a xenon lamp, or the like.

The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as, for example, and without limitation, an RGB sensor, a black-and-white (BW) sensor, an IR sensor, a UV sensor, a plurality of image sensors having the same attribute, a plurality of image sensors having different attributes, or the like. Each image sensor included in the image sensor 230 may be implemented using, for example, and without limitation, a charged coupled device (CCD) sensor, a complementary metal oxide semiconductor (CMOS) sensor, or the like.

The image stabilizer 240 may include various image stabilizing circuitry and move the image sensor 230 and/or at least one lens included in the lens assembly 210 in a particular direction, and/or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using, for example, and without limitation, a gyro sensor (not shown), an acceleration sensor (not shown) disposed inside or outside the camera module 180, or the like. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may include various image signal processing circuitry and perform one or more image processing with respect to an image obtained via the image sensor 230 or an image stored in the memory 250. The one or more image processing may include, for example, and without limitation, depth map generation, three-dimensional (3D) modeling, panorama generation, feature point extraction, image synthesizing, image compensation (e.g., noise reduction, resolution adjustment, brightness adjustment, blurring, sharpening, or softening), or the like. Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
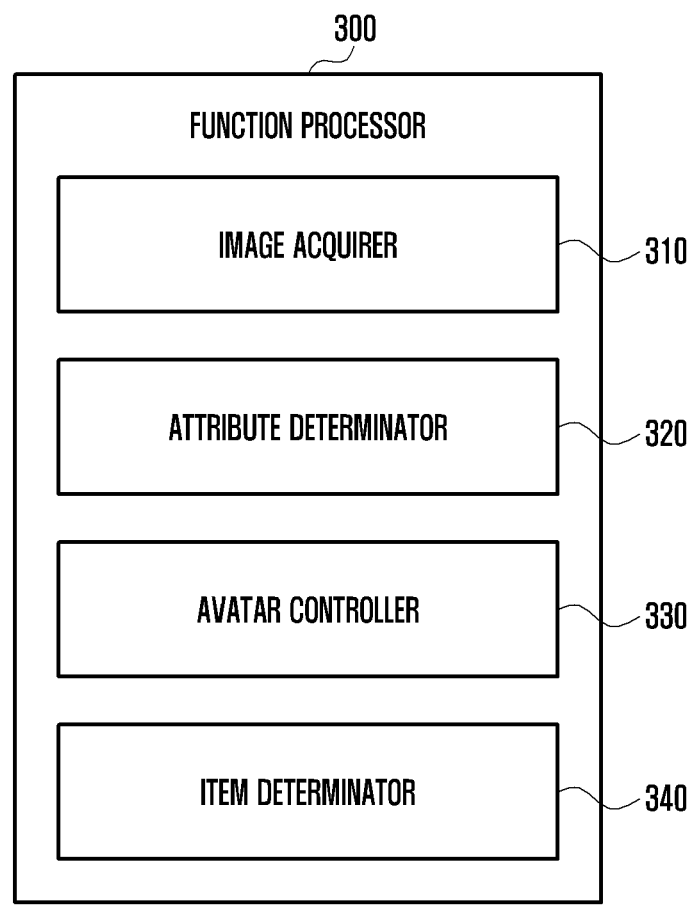
FIG. 3 is a block diagram illustrating an example of a function processor of an electronic device according to various embodiments.

FIG. 3 is a block diagram illustrating an example of a function processor of an electronic device according to various embodiments of the disclosure.

With reference to FIG. 3, a function processor 300 may be included in a processor (e.g., processor 120 of FIG. 1) including a processing circuitry as a hardware module and/or a software module (e.g., executable program elements). The function processor 300 may include an image acquirer (e.g., including processing circuitry and/or executable program elements) 310, an attribute determinator (e.g., including processing circuitry and/or executable program elements) 320, an avatar controller (e.g., including processing circuitry and/or executable program elements) 330, and an item determinator (e.g., including processing circuitry and/or executable program elements) 340.

The image acquirer 310 may include various processing circuitry and/or executable program elements and acquire an image captured by the camera module 180 of the electronic device 101. For example, if a user of the electronic device 101 selects (touches) a "photographing button" in a state where a camera application is being executed, various image processors (e.g., image signal processor, central processing unit, graphic processor, and digital processor) are activated to generate (or process) an image (or image data). The image may refer, for example, to an image of the user. During the photographing, the image acquirer 310 may provide a photographing guide for acquiring an image suitable to generate an avatar. The image acquirer 310 may transfer the acquired image to the attribute determinator 320.

The attribute determinator 320 may include various processing circuitry and/or executable program elements and determine avatar attribute information (or user attribute or user characteristic) using the image. The avatar attribute information may include, for example, and without limitation, at least one of user's age (or years), sex, human race, region (or location), or the like. The attribute determinator 320 may determine the avatar attribute information by analyzing face feature points from the image. For example, the attribute determinator 320 may determine the avatar attribute information based, for example, and without limitation, on an eye size, a distance between two eyes, a nose size and shape, a mouth size and shape, face proportions (e.g., distances between the eye, nose, and mouth), face size, or the like. The attribute determinator 320 may determine the age depending, for example, and without limitation, on whether the number of lines (e.g., wrinkles) detected from the face is small or large in addition to the eye, nose, mouth, etc. Further, the attribute determinator 320 may determine the sex in accordance with, for example, and without limitation, the hair length, skin color, or the like, or it may determine the human race based, for example, and without limitation, on the skin color, face size, face shape, or the like.

The attribute determinator 320 according to various example embodiments may determine one attribute (e.g., age) included in the avatar attribute information, and then it may determine other attributes (e.g., sex, human race, and region). Further, the attribute determinator 320 may determine respective attributes in integrated consideration of all the attributes (e.g., age, sex, human race, and region). For example, the attribute determinator 320 may determine the age, the sex, and the human race corresponding to the avatar from the image, and it may determine the region corresponding to the avatar from regional information set (or stored) in the electronic device 101. The attribute determinator 320 may change the region corresponding to the avatar based on the human race determined from the image, or it may change the human race corresponding to the avatar based on the regional information of the electronic device 101. For example, if the regional information of the electronic device 101 is different from the current location information, the attribute determinator may determine the region corresponding to the avatar in accordance with the setting of the electronic device 101, or it may determine the region corresponding to the avatar based on a user's selection. The attribute determinator 320 according to various embodiments may change the avatar attribute information based on the user input. For this, the attribute determinator 320 may provide a user interface for changing the avatar attribute information, and it may change the avatar attribute information based on the user input inputted through the provided user interface.

The attribute determinator 320 according to various example embodiments may determine the avatar attribute information using machine learning technology, deep learning technology, big data utility technology through a server (e.g., server 108), or the like. In the case where an image including an animal (e.g., dog, cat, pig, tiger, etc.) is acquired, the attribute determinator 320 according to various embodiments may determine the attribute of the animal included in the image to enable different avatars related to the animal to be provided in accordance with the determined attribute. For example, like the human races, there are dog breeds (e.g., bulldog, schnauzer, and poodle). Accordingly, the attribute determinator 230 may determine the animal attribute from the image including the dog, and thus it may enable the avatars having different dog face shapes, fur colors, fur lengths, fur shapes, and fur patterns to be generated in accordance with the dog breeds.

The avatar controller 330 may include various processing circuitry and/or executable program elements and generate an avatar corresponding to the user using the image. The avatar controller 330 may detect a face region including eyes, a nose, and a mouth by analyzing face feature points from the image. In the face region, hair may be or may not be included. For example, the avatar controller 330 may determine face information about the shape, size, and location of the face, eyes, nose, and mouth, respectively, using the feature points. The face information may include face elements or face outlines. The face elements may include eyes, nose, mouth, ears, or peculiar elements (e.g., spot and beard). The face outlines may include face lines (or contours) or hair lines. Because the generated avatar is generated based on the image corresponding to the user, it may be generated in a form similar to the user (e.g., like the user).

The avatar controller 330 according to various example embodiments may generate the avatar based on the face information and the avatar attribute information. For example, because a face in the 10s may be fleshy and wrinkleless in comparison with a face in the 30s, the avatar controller 330 may generate avatars with different wrinkles, spots, body shapes, and body proportions in accordance with their age. For example, a male avatar may have short hair, whereas a female avatar may have long hair or permed hair. The avatar controller 330 may generate avatars with different hair lengths or different statures in accordance with their sex. However, because the hair style is determined based on the image of the user, it may not be unqualified to generate an avatar with short hair even if the avatar attribute information is "male" and to generate an avatar with long hair even if the avatar attribute information is "female".

Further, the avatar controller 330 may generate avatars with different pupil colors, skin colors or face contours, body shapes, body proportions, and statures in accordance with their human race. The avatar controller 330 may generate an avatar determined as a yellow race with eyes having no double eyelid, brown or black pupils, black hair, and dark ivory skin. The avatar controller 330 may generate an avatar determined as a while race with large eyes, blue or green pupils, brown or golden hair, and white skin. Because the avatar generated through further reflection of the avatar attribute information can reflect even user's detailed information in all, it may be like the user more than the avatar that does not reflect the avatar attribute information.

The avatar controller 330 may differently apply hair items (e.g., hijab and turban), clothing items (e.g., hanbok, chipao, and batik), or accessories applicable to avatars in accordance with their region. For example, the avatar controller 330 may differently apply hair styles or hair items (e.g., hijab and turban) to avatars in the region of "Middle East" and to avatars in the region of "Asia". The avatar controller 330 may apply the items determined through the item determinator 340 to the avatar, and it may display the item-applied avatar on the display device (e.g., display device 160 of FIG. 1).

The avatar controller 330 may provide the avatar and the items corresponding to the user attribute (together with the items corresponding to a common attribute). Further, the avatar controller 330 may apply the item selected by the user to the avatar to be provided. Further, the avatar controller 330 may directly provide the item-applied avatar regardless of existence/nonexistence of the user's selection.

The avatar controller 330 according to various example embodiments may generate an emoji based on the avatar. The emoji may refer, for example, to a pictogram generated using a Unicode system, and in the disclosure, it may include an image in which an emotional expression, an operation, a background, or a text is added to the avatar. The avatar controller 330 may generate the emoji using the avatar applying only the avatar attribute information or the avatar applying both the avatar attribute information and the item. For example, in the case of indicating emotional expression "happiness", the avatar controller 330 may differently generate the emoji corresponding to the 10s, 30s, and 50s. Further, in the case of indicating an operation "OK", the avatar controller 330 may differently generate the emoji corresponding to the region of, for example, Korea, India, the United States, etc.

The item determinator 340 may include various processing circuitry and/or executable program elements and determine an item based on the avatar attribute information. The item may include various shapes of objects additionally applicable to the avatar. For example, the item may include clothing and accessories (e.g., hat, spectacles, and earrings). The item determinator 340 may determine the item using the machine learning technology, deep learning technology, big data utility technology, or the like. For example, the item determinator 340 may determine a clothing item corresponding to the avatar in consideration of the point that a 5-year-old girl prefers clothes in pink, and a 20-year-old woman prefers a short skirt or blue jeans. Further, the item determinator 340 may determine traditional clothes by nations as the clothing item in accordance with the region. For example, if the region is the Republic of Korea, the item determinator 340 may determine "hanbok" as the clothing item, and if the region is Vietnam, it may determine "aojai" as the clothing item. Further, if the region is Middle East and the sex is female, the item determinator 340 may determine "hijab" as the clothing item, and if the region is Middle East and the sex is male, the item determinator 340 may determine "turban" as the clothing item. The item determinator 340 may transfer the determined item to the avatar controller 330.

The item determinator 340 according to various embodiments may selectively provide items that can be used for a predetermined period (e.g., season and sports festival (e.g., Olympics or World Cup).

The electronic device 101 according to various embodiments may include a table in which item attributes related to user attributes are stored. The table may, for example, be a Table 1 below.

TABLE 1

|  | Region Asia | | | |
| --- | --- | --- | --- | --- |
|  | Korea | | China | |
| Item Attribute | Male | Female | Male | Female |
| Item Type | Shirt, Trousers, Suit | Shirt, Trousers, Skirt, One Piece | Shirt, Trousers, Suit | Shirt, Trousers, Skirt, One Piece |
| Characteristics |  | Hanbok |  | Chipao |
| Color | Blue, Yellow, Black, Gray | Pink, Red, White |  |  |

For example, the table may include item attributes including at least one of a type, a shape, characteristics, or color corresponding to user attributes including at least one of a sex, an age, a human race, or a region. For example, the item determinator 340 may determine the clothing item (e.g., hanbok or chipao) in consideration of the item characteristics in accordance with the region (e.g., Korea or China), and it may determine the item type (e.g., skirt or one piece) or the item color (e.g., pink or red) in accordance with the sex (e.g., female). The table may be stored in the electronic device 101 or in an external device (e.g., server 108 of FIG. 1) related to this service. If needed, the item determinator 340 may request the table from the external device. The items of the avatar may store the attribute that the corresponding item has as additional information together with the image corresponding to the item. Further, the additional information may be stored in the external device, and if needed, the item determinator 340 may request the additional information from the external device.

If the user attribute is identified, the item determinator 340 may identify the item attribute corresponding to the user attribute with reference to the table, and may identify the items having the corresponding item attribute among all items. Further, if the electronic device 101 may store only some items, the item determinator 340 may additionally download the items that are not stored in the electronic device 101 from the external device.

An electronic device (e.g., electronic device 101 of FIG. 1) according to various example embodiments may include a camera (e.g., camera module 180 of FIG. 1); a display (e.g., display device 160 of FIG. 1); and a processor (e.g., processor 120 of FIG. 1), wherein the processor is configured to control the electronic device to: acquire an image of a user of the electronic device using the camera, generate an avatar corresponding to the user using the image, identify attribute information corresponding to the avatar using the image, identify at least one item corresponding to the attribute information among a plurality of items applicable to the avatar, and display the at least one item with the avatar through the display.

The processor may be configured to control the electronic device to apply the item selected from the at least one item to the avatar and to display the selected item with the avatar through the display.

The attribute information may include at least one of a human race, a sex, an age, or a region, and the processor may be configured to control the electronic device to identify the at least one item corresponding to the human race, the sex, the age, or the region.

The processor may be configured to control the electronic device to adjust at least one setting of a face size or shape corresponding to the avatar, an eye size or color, a skin color, a hair color, or a hair style based on the attribute information.

The item may include at least one of clothing, a hat, or an accessory, and the processor may be configured to control the electronic device to identify the at least one item corresponding to the clothing, the hat, or the accessory.

The processor may be configured to control the electronic device to differently apply a clothing item to the avatar in accordance with the region of the attribute information.

The processor may be configured to control the electronic device to generate an emoji to which at least one of a designated emotional expression, an operation, a background, or a text is applied using the avatar to which the at least one item is applied.

An electronic device (e.g., electronic device 101 of FIG. 1) according to various example embodiments may include a camera (e.g., camera module 180 of FIG. 1); a display (e.g., display device 160 of FIG. 1); and a processor (e.g., processor 120 of FIG. 1), wherein the processor is configured to control the electronic device to: determine a user attribute from an image including a user of the electronic device, generate an avatar based on the determined user attribute and display the generated avatar through the display, determine at least one item to be applied to the avatar based on the user attribute, and display the avatar to which the at least one item is applied through the display.

The processor may be configured to control the electronic device to determine whether location information determined through the user attribute is different from regional information set in the electronic device, and based on the location information and the regional information being different from each other, the processor may be configured to control the electronic device to determine location information to be applied to the avatar based on an input.

The processor may be configured to control the electronic device to: receive an input for changing the user attribute from the user, display a user interface for changing the user attribute on the display, change the user attribute based on an input on the user interface, and change the avatar based on the changed user attribute.

The processor may be configured to control the electronic device to generate an emoji in which at least one of an emotional expression, an operation, a background, or a text is added to the avatar to which the at least one item is applied.

Figure 4:
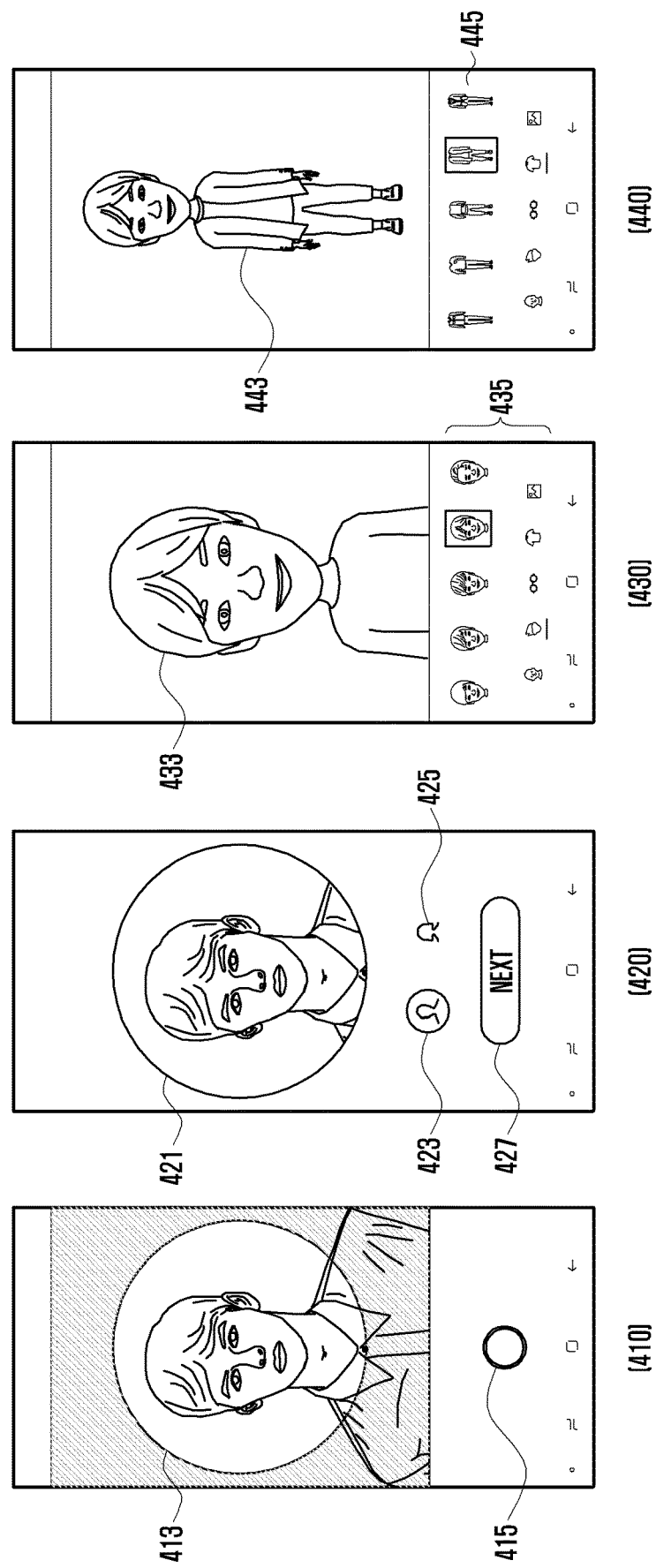
FIG. 4 is a diagram illustrating an example of a user interface for generating an avatar using a user image according to various embodiments.

FIG. 4 is a diagram illustrating an example of a user interface for generating an avatar using a user image according to various embodiments.

With reference to FIG. 4, a first user interface 410 may output an image acquired through a camera module (e.g., camera module 180 of FIG. 1) onto the display (e.g., display device 160 of FIG. 1) as a preview image 413. The processor (e.g., processor 120 of FIG. 1) of the electronic device (e.g., electronic device 101 of FIG. 1) may drive the camera module 180 by executing a camera application in accordance with a user's selection. An image acquirer (e.g., image acquirer 310 of FIG. 3) of the processor 120 may acquire an image in accordance with a selection of a photographing button 415 on the first user interface 410. Although not illustrated, the first user interface 410 may provide a photographing guide for acquiring an image (e.g., image including the upper half of the user's body) suitable to avatar generation. The photographing guide may be provided in the form of an image or a text through the display device 160 or may be vocally provided through a speaker (sound output device 155 of FIG. 1).

A second user interface 420 may output an operation for determining avatar attribute information (or user attribute or user characteristics) from the acquired (or photographed) image onto the display device 160. For example, an attribute determinator (e.g., attribute determinator 320 of FIG. 3) of the processor may determine the avatar attribute information from the image acquired through the image acquirer 310, and it may receive a user input for determining the avatar attribute information. For example, the second user interface 420 may include an image 421, a male icon 423 and a female icon 425 for the user to select information on the sex among the avatar attribute information, and an OK button (or NEXT button) 427. If the user selects the OK button 427 after selecting the male icon 423, the processor 120 may determine the sex of the avatar attribute information as "male". Further, if the user selects the OK button 427 after selecting the female icon 425, the processor 120 may determine the sex of the avatar attribute information as "female". Although not illustrated, the processor 120 may determine the age, human race, and region based on the user input.

A third user interface 430 may output the generated avatar onto the display device 160. For example, an avatar controller (e.g., avatar controller 330 of FIG. 3) of the processor 120 may generate the avatar using feature points included in the acquired image, or it may generate the avatar using the avatar attribute information. The third user interface 430 may include a guide 435 for an avatar 433 and an avatar (or avatar attribute information) change. The processor 120 may change the shapes or sizes of eyes, a nose, and a mouth of the avatar, a hair color, a hair style, a face shape, and a skin color based on the user input.

A fourth user interface 440 may apply an item to the avatar and it outputs the avatar onto the display device 160. The item determinator (e.g., item determinator 340 of FIG. 3) of the processor 120 may apply (or determine) at least one item to the avatar based on the item attribute information. For example, the processor 120 may a clothing item as a "suit" based on the age (e.g., 20s) or the region (e.g., Korea). The fourth user interface 440 may include the avatar 443 to which an item is applied and an item list 445 for changing the item. The processor 120 may change at least one item based on the user input. For example, the processor 120 may generate a plurality of suits having different colors or patterns as an item list 445. The item list 445 may be differently generated in accordance with the item attribute information. For example, the processor 120 may differently (e.g., age difference) generate clothes in the 0s (e.g., 0 to 9 years) and clothes in the 20s (e.g., 20 to 29 years), and it may differently (e.g., weather difference) generate clothes of Thailand and clothes of Canada.

Figure 5:
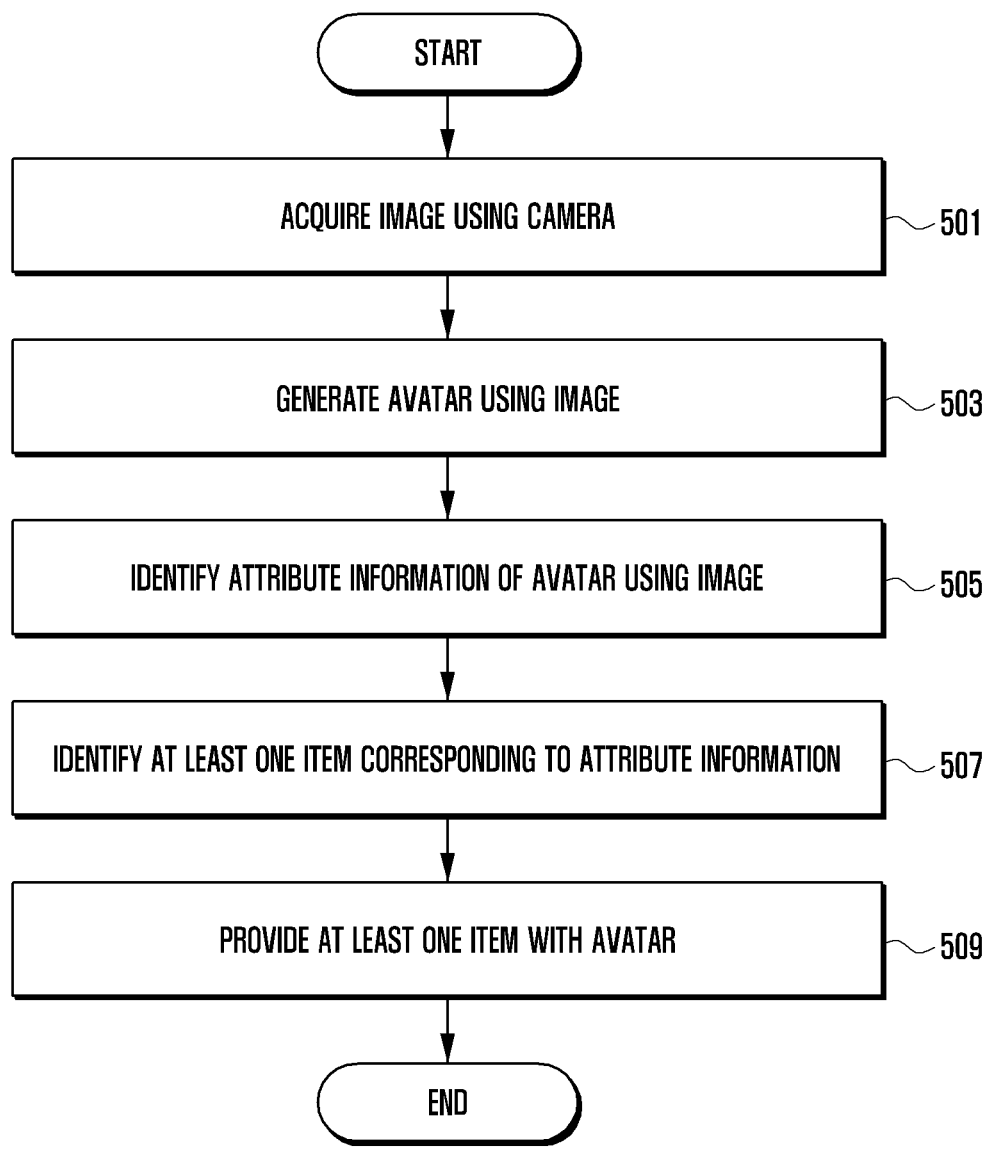
FIG. 5 is a flowchart illustrating an example method for applying an item in accordance with avatar attribute information to an avatar according to various embodiments.

FIG. 5 is a flowchart illustrating an example method for applying an item in accordance with avatar attribute information to an avatar according to various embodiments.

With reference to FIG. 5, at operation 501, a processor (e.g., processor 120 of FIG. 1 or function processor 300 of FIG. 3) of an electronic device (e.g., electronic device 101 of FIG. 1) may acquire an image using a camera (e.g., camera module 180 of FIG. 1). For example, the processor 120 (e.g., image acquirer 310 of FIG. 3) may acquire the image displayed on a display (e.g., display device 160 of FIG. 1) as a preview image in accordance with a user input for selecting a photographing button.

At operation 503, the processor 120 may generate an avatar using the acquired image. The processor 120 (e.g., avatar controller 330 of FIG. 3) may analyze face feature points from the image, determine face information, such as shapes, sizes, and locations of a face, eyes, a nose, and a mouth, respectively, and generate the avatar using face information. The processor 120 according to various embodiments may generate the avatar based on the face information and the avatar attribute information. The avatar attribute information may include at least one of an age, a sex, a human race, or a region, and it may be determined before or after the avatar generation. For example, the processor 120 may generate avatars in accordance with the age, that is, with no wrinkle in their 20s to 30s, with a few wrinkles in their 40s to 50s, and with so many wrinkles after their 60s. Further, as the age becomes older, the processor 120 may generate the avatar with the body shape that is gradually stouter. The processor 120 may generate the avatar with a white, little dark, or black skin color in accordance with the human race.

At operation 505, the processor 120 may identify the avatar attribute information (or user attribute or user characteristics) using the image. For example, operations 503 and 505 may be simultaneously performed, or operation 505 may be first performed and operation 503 may be performed later, and vice versa. This is merely an example, and the disclosure is not limited thereto. The processor 120 (e.g., attribute determinator 320 of FIG. 3) may divide the age into 0 to 9 years (e.g., 0s), 10 to 19 years (e.g., 10s), 20 to 29 years (e.g., 20s), 30 to 39 years (e.g., 30s), 40 to 49 years (e.g., 40s), 50 to 59 years (50s), 60 to 69 years (e.g., 60s), 70 to 79 years (e.g., 70s), 80 to 89 years (e.g., 80s), and 90 years or more. Further, the processor 120 may divide the age into 0s to 10s, 20s to 30s, 40s to 50s, 60s to 70s, and 80s or more.

The processor 120 according to various embodiments may not determine the sex using the image, but may determine the sex in accordance with a preset value or a user input. For example, if it is determined that the user acquired from the image is the user of the electronic device 101, the processor 120 may determine the sex based on user information set in an application (e.g., healthcare application) installed in the electronic device 101. Further, if it is determined that the user acquired from the image is not the user of the electronic device 101, the processor 120 may request a sex input (e.g., second user interface 420 of FIG. 4). Further, the processor 120 may not determine the sex using the image, but may determine the sex in accordance with the user input.

The processor 120 according to various embodiments may classify the human race into 6 categories: a white, a yellow, a black, Pygmy people, Khoisan people, and Indigenous Australian. Further, among Arabians and Indians, the processor 120 may classify the human race in a manner that Aryan is classified as a white, and Hispanic and Dravidian are classified as a yellow. Further, the processor 120 may classify the human race into three categories: a white, a yellow, and a black. The method for classifying the human race is merely exemplary in implementation, and the disclosure is not limited thereto. The processor 120 may determine the human race based on the skin color acquired from the image. The processor 120 may adjust the body proportions of the avatar corresponding to the classified human race. For example, the processor 120 may generate an avatar corresponding to a yellow to be more slender than an avatar corresponding to a white. Further, the processor 120 may change the body shape of an avatar based on the human race or the body shape preferred in a nation.

The processor 120 according to various embodiments may determine the region from the regional information set (or stored) in the electronic device 101. Because the electronic device 101 has a different manufacturing number in accordance with a nation in which the electronic device is manufactured, and a communication type or frequency being used differs in accordance with the nation, the processor 120 may determine the region from the regional information set in the electronic device 101. If the regional information of the electronic device 101 is different from the current location information, the processor 120 according to various embodiments may determine the region corresponding to the avatar in accordance with the setting of the electronic device 101 or based on the user's selection.

At operation 507, the processor 120 may identify at least one item corresponding to the attribute information among a plurality of items applicable to the avatar. The item may include various shapes of objects additionally applicable to the avatar. For example, the item may include clothing, a hat, and accessories (e.g., spectacles and earrings). If a woman in her 20s is determined from the avatar attribute information, the processor 120 may determine short skirt oriented clothing items, whereas if a woman in her 40s is determined from the avatar attribute information, the processor 120 may determine dark-colored pants or long skirt oriented clothing items in consideration of the age difference between the women of the same sex. Further, if a man in his 40s is determined from the avatar attribute information, the processor 120 may determine suit-oriented clothing items. Further, the processor 120 may determine traditional clothes by nations as the clothing item in accordance with the region. For example, if the region is China, the processor 120 may determine the "chipao" including a reddish or colorful pattern as the item, and it may determine a skirt-shaped chipao or pants-shaped chipao as the item in accordance with the sex.

At operation 509, the processor 120 may provide the at least one item with the avatar through the display (e.g., display device 160 of FIG. 1). The processor 120 may apply the selected one of the at least one item to the avatar to be provided through the display device 160. The processor 120 may display an item list simultaneously with the display of the item-applied avatar (e.g., fourth user interface 440 of FIG. 4). The item list may include at least one item determined based on the avatar attribute information. The processor 120 may obtain at least one item selected from the item list based on the user input, and it may apply the selected item to the avatar to be displayed. If the avatar generation or the item selection is completed, the processor 120 according to various embodiments may generate an emoji (or sticker) based on the generated avatar.

Figure 6A:
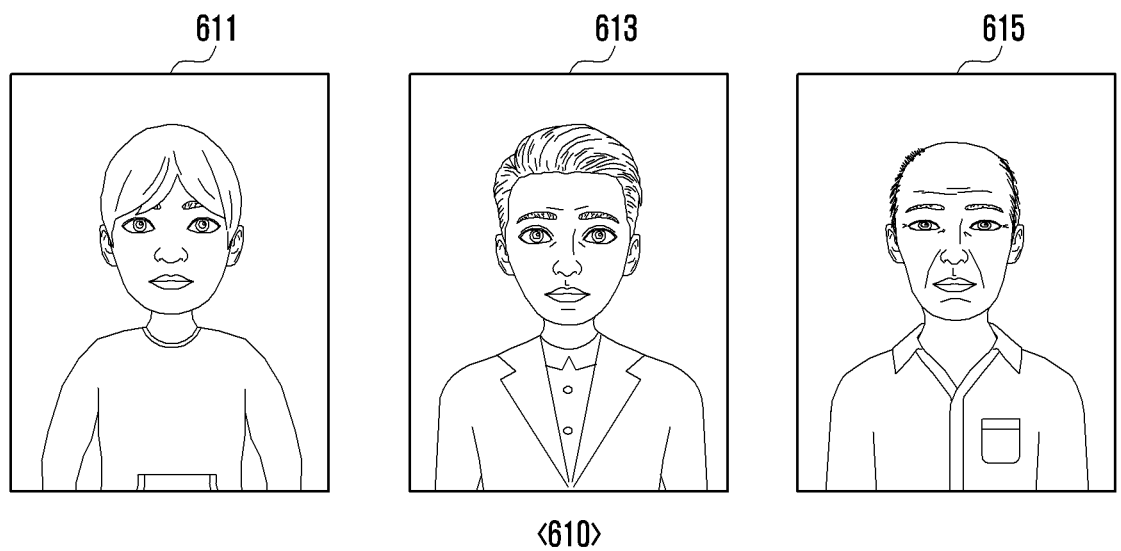
FIG. 6A is a diagram illustrating an example in which an electronic device differently generates avatars in accordance with ages according to various embodiments.
Figure 6A:
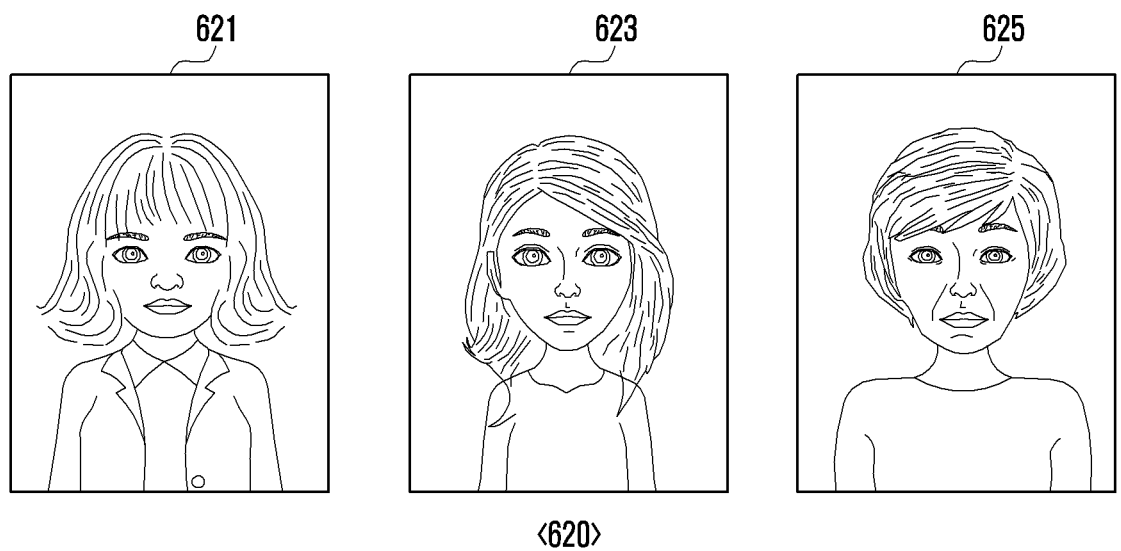
Figure 6B:
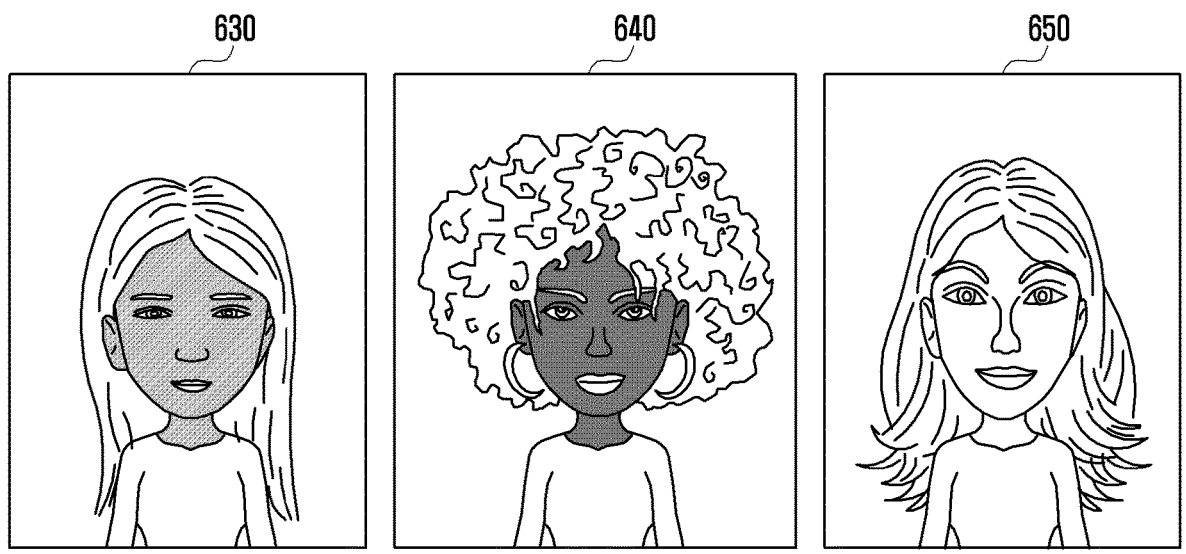
FIG. 6B is a diagram illustrating an example in which an electronic device differently generates avatars in accordance with human races according to various embodiments.
Figure 6C:
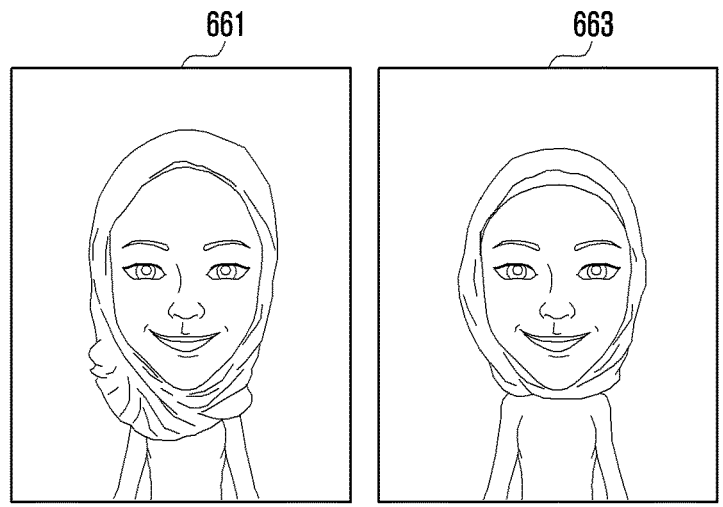
FIG. 6C is a diagram illustrating an example in which an electronic device differently generates avatars in accordance with regions according to various embodiments.
Figure 6C:
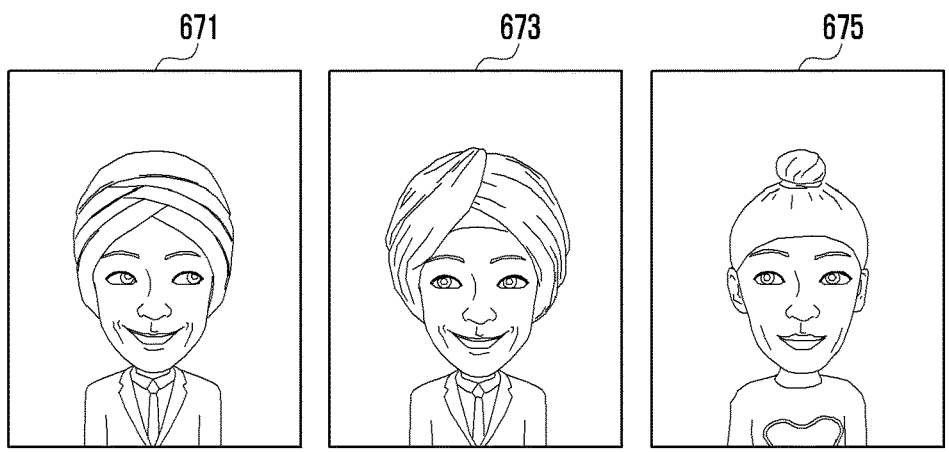
Figure 6C:
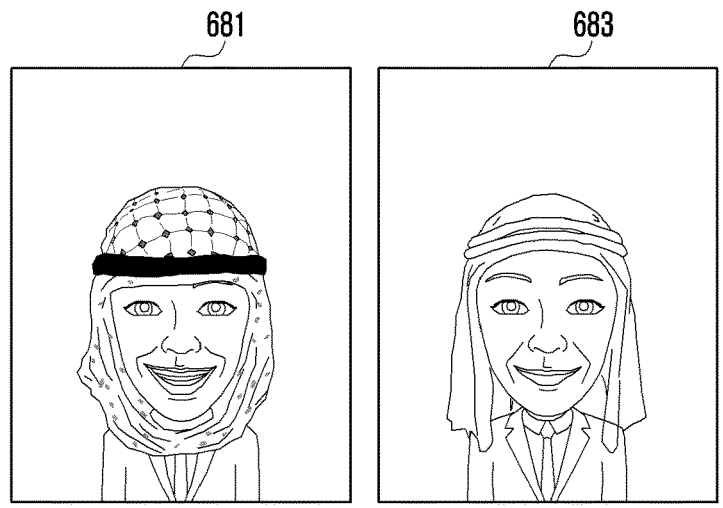

FIGS. 6A, 6B and 6C are diagrams illustrating an example in which avatars are differently generated in accordance with avatar attribute information according to various embodiments.

FIG. 6A is a diagram illustrating an example in which avatars are differently generated in accordance with age.

With reference to FIG. 6A, male avatars 610 may be classified into a male avatar 611 in his 10s, a male avatar 613 in his 30s, and a male avatar 615 in his 60s. It may be known that the male avatar 611 in his 10s has a large face and large pupils. It may be known that the male avatar 613 in his 30s has thicker and fuller hair than that of the male avatar 615 in his 60s, a slender face, and a somewhat enlarged face shape. It may be known that the male avatar 615 has almost no hair, small eyes, and many wrinkles. Female avatars 620 may be classified into a female avatar 621 in her 10s, a female avatar 623 in her 30s, and a female avatar 625 in her 60s. The female avatar 621 in her 10s may have short hair, the female avatar 623 in her 30s may have long hair, and the female avatar 625 in her 60s may have short permed hair. That is, it may be known that the avatar of the disclosure differently expresses the hair style, face shape, eye size, eye shape, and wrinkles in accordance with the age.

FIG. 6B is a diagram illustrating an example in which avatars are differently generated in accordance with human races according to various embodiments.

With reference to FIG. 6B, the processor 120 may classify the human races into a yellow avatar 630, a black avatar 640, and a white avatar 650. The yellow avatar 630 may be generated with black long raw hair, a little dark skin color, small slant eyes, black or brown pupils, and a short small nose. The black avatar 640 may be generated with short curly (or Reggae) hair, a dark skin color, large eyes, black or brown pupils, and a small nose. The white avatar 650 may be generated with long permed hair, a narrow slim face shape, a bright skin color, large round eyes, blue or green pupils, and a long thin nose. However, different avatars in accordance with the human races may be in consideration of the characteristics of the human races. For example, even if the human race is determined as a yellow, there may be a user having a similar appearance to a white (e.g., person with bright skin color and large eyes). In order to generate an avatar having a similar appearance to a user based on an image, the processor 120 may not reflect the human race characteristics in the avatar. Further, the processor 120 may set a weight to reflect the human race characteristics based on the user input, and may or may not reflect the human race characteristics in the avatar in accordance with the set weight.

FIG. 6C is a diagram illustrating an example in which avatars are differently generated in accordance with regions.

With reference to FIG. 6C, the processor 120 may differently generate hair items of an avatar in accordance with the region. If it is determined that the sex is female, and the region is Iran, the processor 120 may generate (or apply) hijab 660 as the hair item. The processor 120 may provide different types of hijab items 661 and 663 having different colors or patterns as a hair item list. If the sex is male, and the region is India, the processor 120 may generate (or apply) turban 670 as the hair item. The processor 120 may provide different types of turban items 671, 673, and 675 having different colors, shapes, or patterns as a hair item list. If the sex is male, and the region is Saudi Arabia, the processor 120 may generate (or apply) Keffiyeh as a hair item. The processor 120 may provide different kinds of Keffiyeh items 681 and 683 having different colors, shapes, or patterns as the hair item list.

FIGS. 7A, 7B, 7C, 7D and 7E are diagrams illustrating different examples in which items are differently applied in accordance with avatar attribute information according to various embodiments.

Figure 7A:
FIG. 7A is a diagram illustrating an example in which an electronic device differently applies items in accordance with ages of female avatars according to various embodiments.
Figure 7A:
Figure 7A:
Figure 7A:
Figure 7A:
Figure 7A:
Figure 7A:
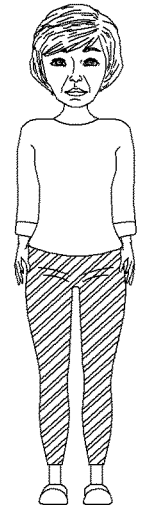
Figure 7A:
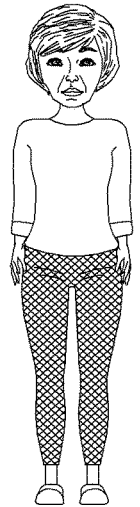
Figure 7A:
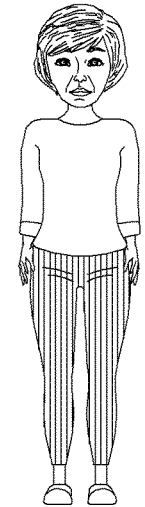

FIG. 7A is a diagram illustrating an example in which items are differently applied in accordance with ages of female avatars according to various embodiments. The processor 120 may apply preferable clothing items to avatars in accordance with the sex or age. For example, the processor 120 may apply pinkish clothing items corresponding to a female avatar 710 in her 10s, apply skirt or one piece type clothing items corresponding to a female avatar 720 in her 20s, and apply pants type clothing items corresponding to a female avatar 730 in her 40s. The processor 120 may generate the avatar 710 in her 10s with a stature that is smaller than those of the avatar 720 in her 20s and the avatar 730 in her 40s.

The processor 120 according to various embodiments may differently apply clothing items in accordance with the weather in a nation. For example, the processor 120 may differently generate colors, patterns, and shapes of clothing items with respect to avatars for which a nation having a constant weather throughout the year (e.g., Philippines) is determined as the region. However, the processor 120 may differently generate categories of clothing items with respect to avatars for which a nation having distinct seasons (e.g., Japan) is determined as the region. For example, in winter, padding, coats, and boots are applied as clothing items, and in summer, short sleeve, sleeveless, skirt, and one piece are applied as clothing items. In spring/autumn, long clothes are applied as clothing items.

Figure 7B:
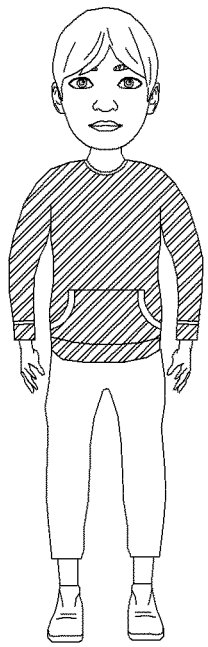
FIG. 7B is a diagram illustrating an example in which an electronic device differently applies items in accordance with ages of male avatars according to various embodiments.
Figure 7B:
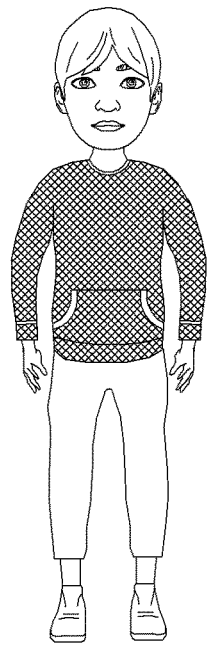
Figure 7B:
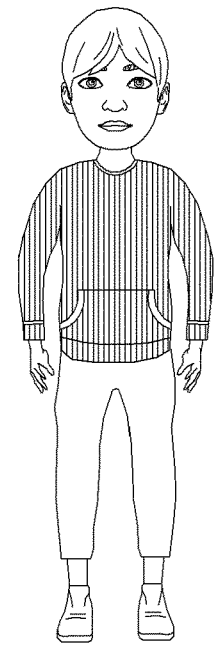
Figure 7B:
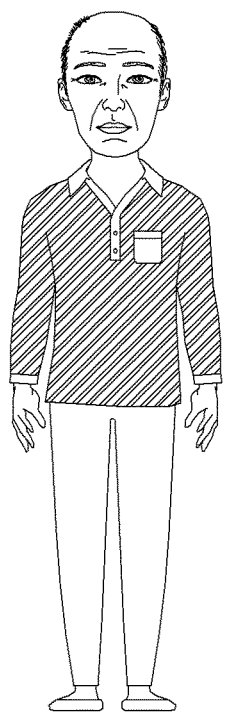
Figure 7B:
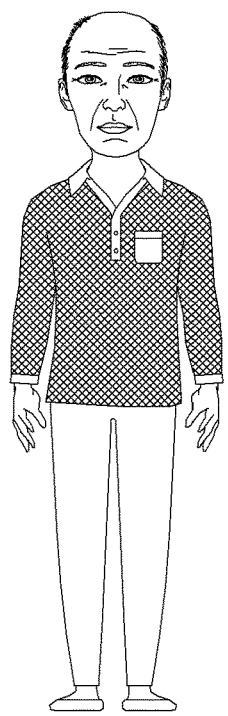
Figure 7B:
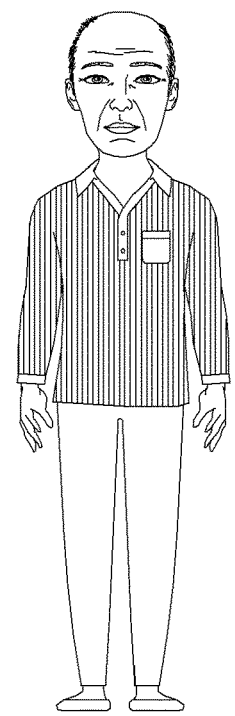

FIG. 7B is a diagram illustrating an example in which items are differently applied in accordance with ages of male avatars. For example, the processor 120 may apply T-shirt and pants appearances as clothing items to correspond to a male avatar 740 in his 10s, and it may apply pique shirts and pants appearances as clothing items to correspond to a male avatar 750 in his 60s.

Figure 7C:
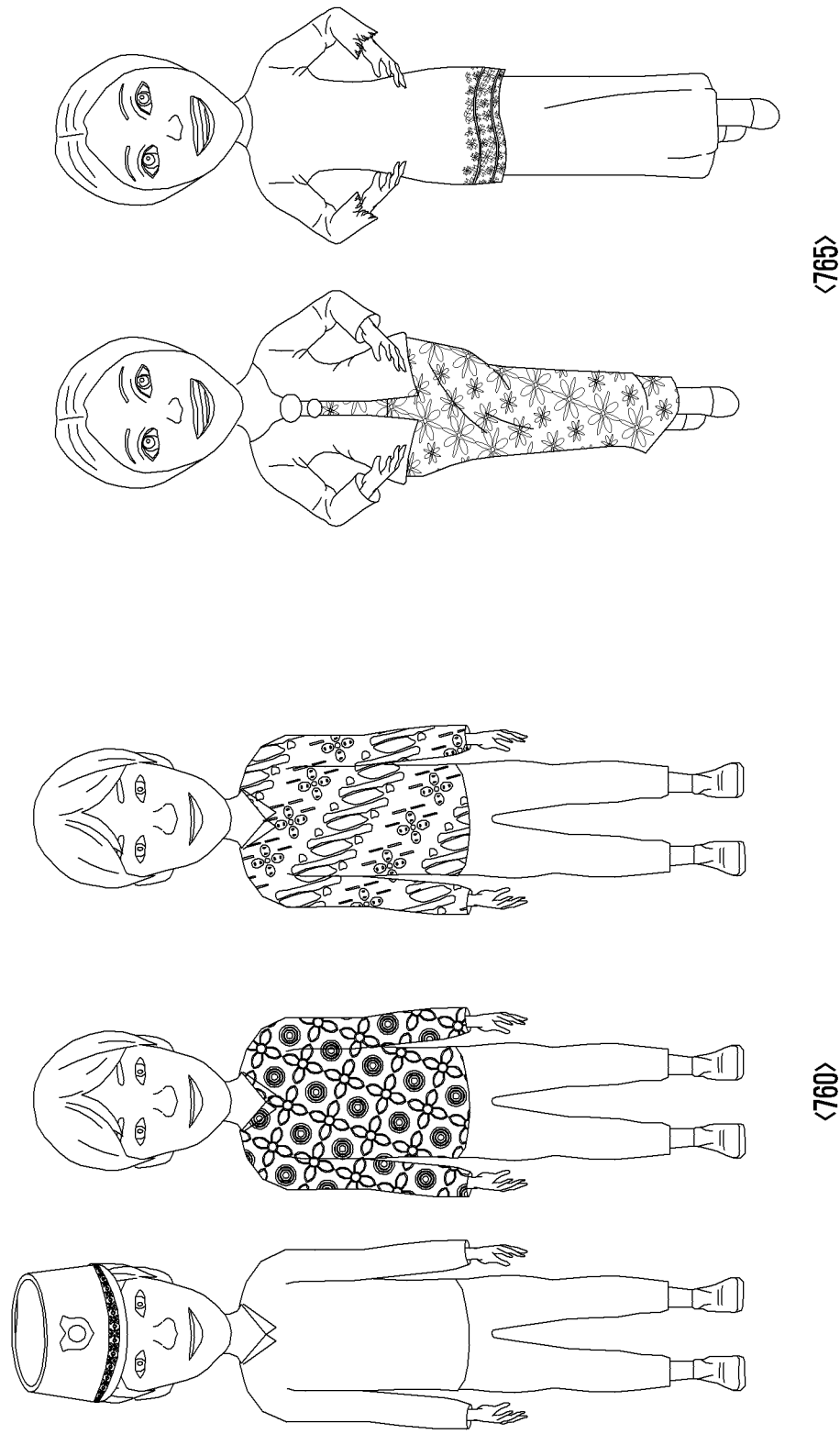
FIG. 7C is a diagram illustrating an example in which an electronic device differently applies items in accordance with regions of avatars according to various embodiments.

FIG. 7C is a diagram illustrating an example in which items are differently applied in accordance with regions of avatars. For example, the processor 120 may apply (or determine) Indonesian male traditional clothes (e.g., batik) as clothing items to correspond to a male avatar 760 for which the region is Indonesia, and it may apply Indonesian female traditional clothes as clothing items to correspond to a female avatar 765 for which the region is Indonesia.

Figure 7D:
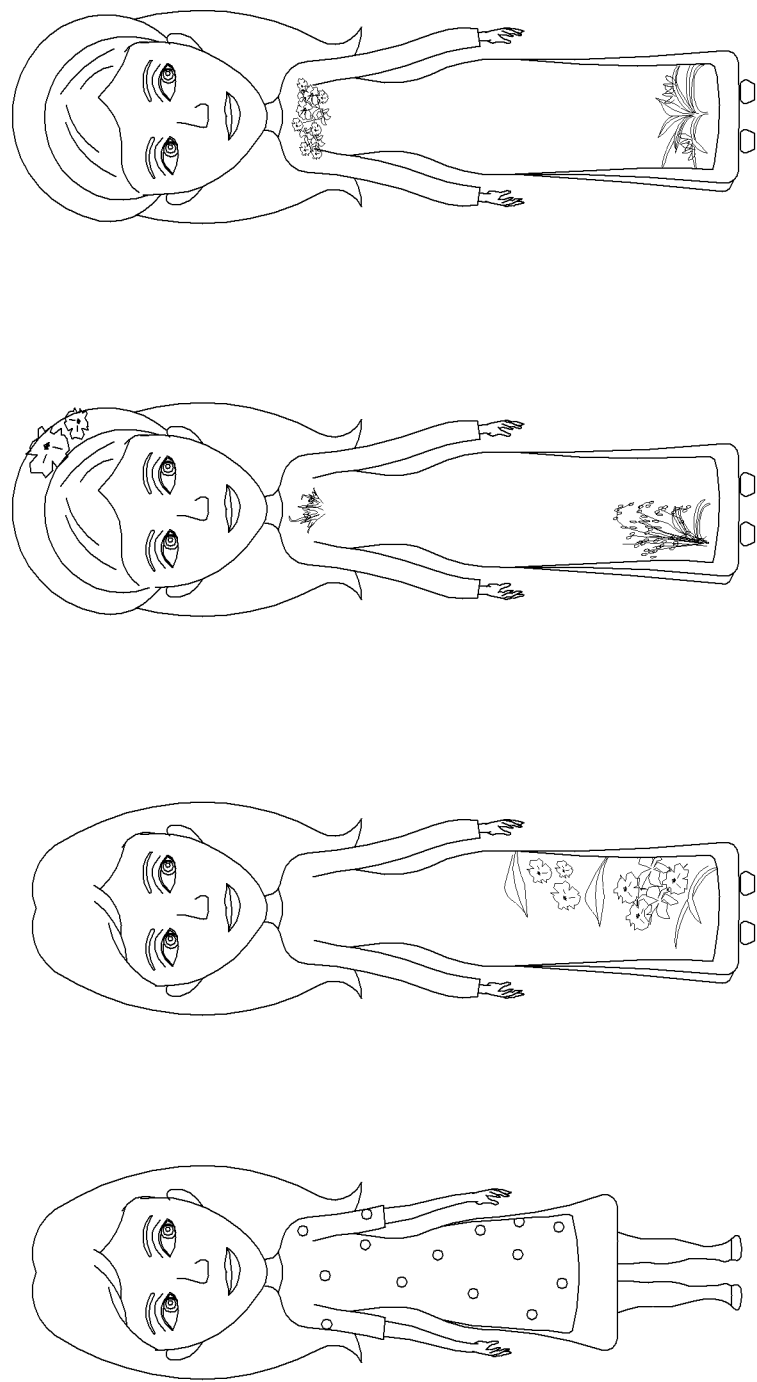
FIG. 7D is a diagram illustrating an example in which an electronic device differently applies items in accordance with regions of female avatars according to various embodiments.

FIG. 7D is a diagram illustrating an example in which items are differently applied in accordance with regions of female avatars. For example, the processor 120 may apply Vietnam traditional clothes (e.g., aojai) as clothing items to correspond to a female avatar 770 for which the region is Vietnam.

Figure 7E:
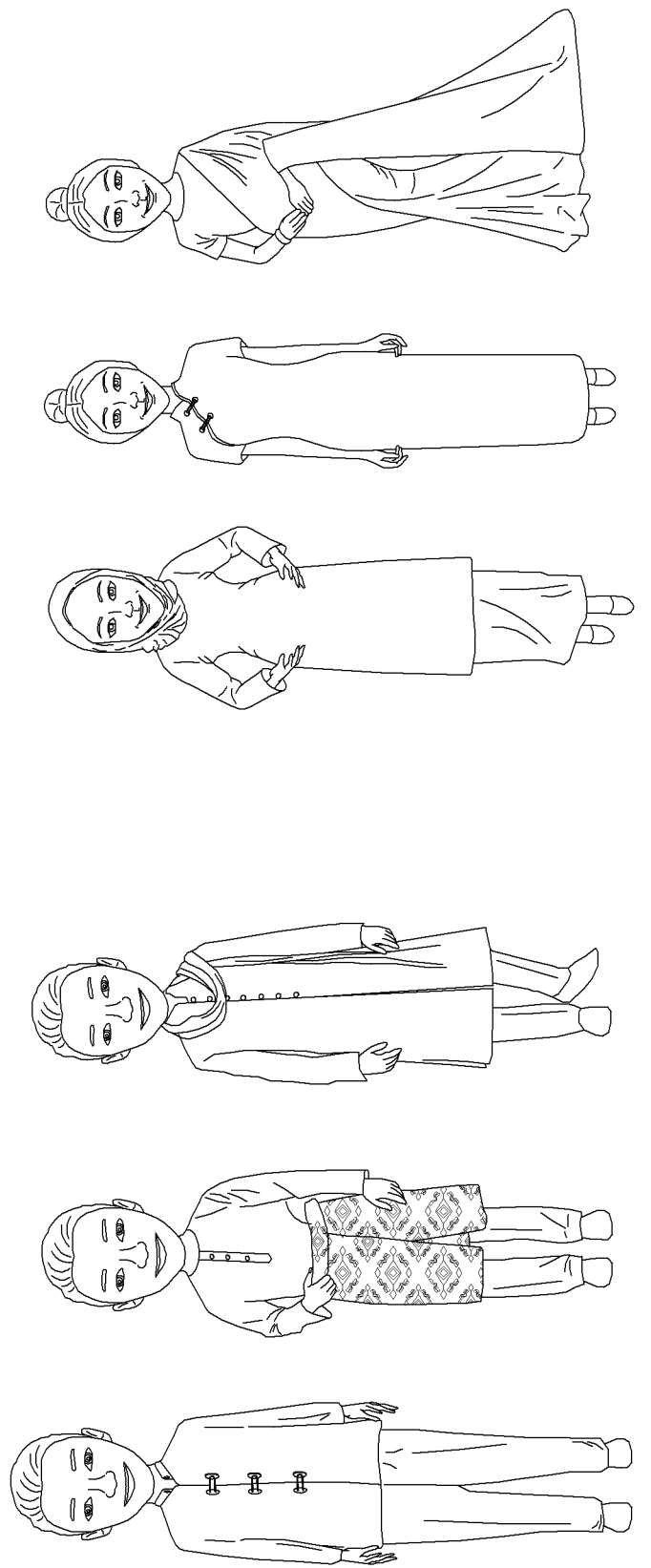
FIG. 7E is a diagram illustrating an example in which an electronic device differently applies items in accordance with regions of avatars according to various embodiments.

FIG. 7E is a diagram illustrating an example in which items are differently applied items in accordance with regions of avatars. For example, the processor 120 may apply Malaysian male traditional clothes (e.g., Baju Melayu) as clothing items to correspond to a male avatar 780 for which the region is Malaysia, and it may apply Malaysian female traditional clothes (e.g., Baju Kurung) as clothing items to correspond to a female avatar 785 for which the region is Malaysia.

Figure 8:
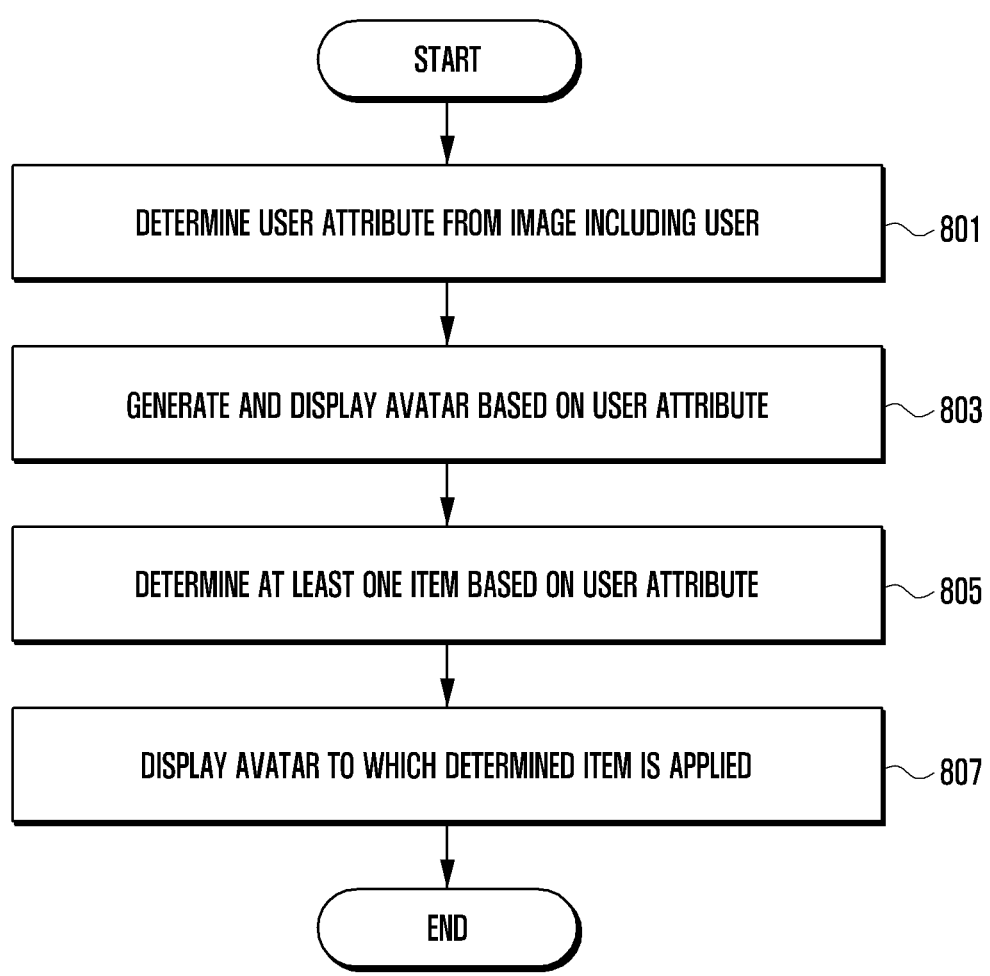
FIG. 8 is a flowchart illustrating an example method for generating an avatar in accordance with a user attribute according to various embodiments.

FIG. 8 is a flowchart illustrating an example method for generating an avatar in accordance with a user attribute according to various embodiments.

With reference to FIG. 8, at operation 801, a processor (e.g., processor 120 of FIG. 1 or function processor 300 of FIG. 3) of an electronic device (e.g., electronic device 101 of FIG. 1) may determine a user attribute from an image including the user. The image may be captured by a camera module 180 of FIG. 1, or it may be stored in a memory (e.g., memory 130 of FIG. 1) of the electronic device 101. Further, the image may be downloaded from an external device (e.g., electronic device 102 or electronic device 104). The image may be selected by a user to generate an avatar. The processor 120 may detect a face region from the image using a face recognition algorithm, and it may extract feature points from the detected face region. The processor 120 (e.g., attribute determinator 320 of FIG. 3) may determine the user attribute using the feature points. The user attribute (or user attribute information or user characteristic information) may correspond to the avatar attribute information, and it may include at least one of an age, a sex, a human race, or a region. The processor 120 may determine the user attribute based on the image, and it may change the user attribute in accordance with the user selection.

At operation 803, the processor 120 (e.g., avatar controller 330 of FIG. 3) may generate an avatar based on the user attribute, and it may display the generated avatar on a display (e.g., display device 160). For example, the processor 120 may generate an avatar corresponding to the sex of female, age of 10s, human race of a white, and region of the United States based on the user attribute including the sex of female, age of 10s, human race of a white, and region of the United States. The processor 120 may display the generated avatar through the display device 160, and it may change the avatar based on the user selection. Detailed operations for the avatar change will be hereinafter described in detail through FIG. 9A.

At operation 805, the processor 120 (e.g., item determinator 340 of FIG. 3) may determine at least one item based on the user attribute. For example, if the sex is female, the processor 120 may determine a skirt or one piece as an item, and if the age is 10s, the human race is a white, and the region is the United States, the processor 120 may determine reddish and whitish clothing as an item. Further, if the age is 10s, pinkish clothing may be determined as an item. The processor 120 according to various embodiments may include a table in which the item attribute related to the user attribute is stored. The table may include the item attribute including at least one of a type, a shape, characteristics, or a color corresponding to the user attribute including, for example, at least one of a sex, an age, a human race, or a region. The processor 120 may determine at least one item corresponding to the user attribute from the table.

At operation 807, the processor 120 (e.g., avatar controller 330 of FIG. 3) may display the avatar to which the determined item is applied on the display (e.g., display device 106 of FIG. 1). For example, the avatar to which the item is applied may be the avatar as illustrated in FIGS. 7A to 7E. The user may identify the avatar, and it may determine whether to change the item.

Figure 9A:
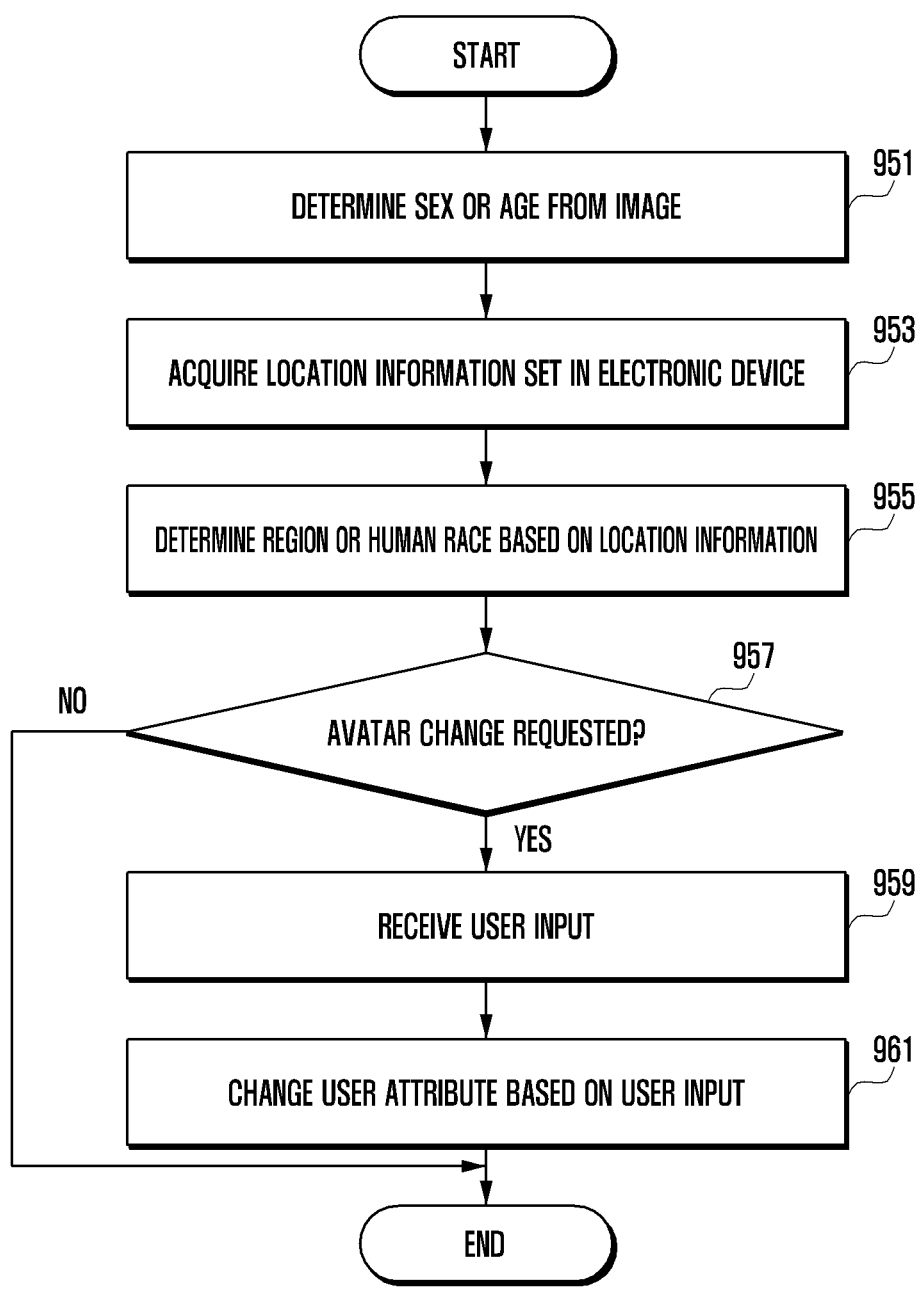
FIG. 9A is a flowchart illustrating an example method for changing an avatar according to various embodiments.

FIG. 9A is a flowchart illustrating an example method for changing an avatar according to various embodiments.

With reference to FIG. 9A, at operation 951, the processor (e.g., processor 120 of FIG. 1 or function processor 300 of FIG. 3) of the electronic device (e.g., electronic device 101 of FIG. 1) may determine the sex or age from the image. For example, the processor 120 may determine the sex or age that is the user attribute using an image-based face recognition algorithm.

At operation 953, the processor 120 (e.g., attribute determinator 320) may acquire location information set in the electronic device 101. The location information set in the electronic device 101 may be regional information set in the electronic device 101. Because a communication type or frequency being used differs in accordance with the nation, the regional information set in the electronic device 101 may mean a nation (or region) set during manufacturing of the electronic device 101. Further, the processor 120 may acquire the current location information of the electronic device 101.

At operation 955, the processor 120 (e.g., attribute determinator 320) may determine the region or the human race based on the location information. The processor 120 may determine the human race corresponding to the avatar based on the skin color of the image, and it may change the human race corresponding to the avatar based on the location information. Further, the processor 120 may determine the region corresponding to the avatar based on the determined human race, or it may determine the human race corresponding to the determined region.

At operation 957, the processor 120 may determine whether there is an avatar change request for changing the determined user attribute. If the user attribute is determined, the processor may generate and display the avatar corresponding to the user attribute. The user may identify the display avatar, and if the avatar is satisfactory or if the user attribute is intended to be changed, the user may request the attribute change. For example, in the case where the user is a white, but he/she is determined as a yellow by the regional information and the avatar is provided, the user may desire to change the human race of the avatar. Further, the user may desire to change the user attribute, that is, any one of the age, sex, human race, and region. If the change is requested, the processor 120 may perform an operation 959, whereas if the change is not requested, the processor 120 may complete (or end) the avatar generation.

At operation 959, the processor 120 may receive the user input. For example, the processor 120 may provide a user interface related to the user attribute in accordance with the attribute change request. The processor 120 may provide a user interface including a change field corresponding to the sex, age, human race, and region. The processor 120 may provide a sex field for selecting female or male in relation to the sex, or it may provide an age field for selecting at least one of 10s, 20s to 30s, 40s to 50s, 60s to 70s, and 80s or more in relation to the age. The processor 120 may provide an age field for selecting at least one of a white, a yellow, a black, Pygmy people, Khoisan people, and Indigenous Australian in relation to the human races. The processor 120 may provide a regional field for selecting a nation if one is selected from a regional field that is classified into Asia, Africa, North America, South America, South Pole, Europe, and Australia in relation to the region.

At operation 961, the processor 120 may change the user attribute based on the user input. The processor 120 may change the user attribute, and it may generate the avatar based on the changed user attribute. The processor 120 may display the avatar having the changed user attribute on the display device 160. For example, the avatar may be greatly changed (e.g., eye size, eye color, face size, and skin color change) in accordance with the user attribute change, or the change difference of the avatar may not be great.

The processor 120 according to various embodiments may determine whether the current location of the electronic device 101 is different from the regional information set in the electronic device 101. The user who has purchased and used the electronic device 101 in Korea may desire to generate an avatar in the United States through traveling. In the case of different location information, the processor 120 may output a guide for changing the location information on the image corresponding to the user. For example, the guide may be provided in the form of an image (e.g., national icon display) or a text (e.g., "Will you change the location?") through the display (e.g., display device 160 of FIG. 1), or the guide may be provided by voice through a speaker (sound output device 155 of FIG. 1). The processor 120 may receive the user input for selecting any one of the current location of the electronic device 101 and the regional information set in the electronic device 101, and it may correct (or change) the region that is the user attribute based on the user input. For example, if the location information is not different from the regional information, the processor 120 may generate the avatar in accordance with the user attribute determined based on the image. Further, if the location information change is completed, the processor may generate the avatar by further reflecting the regional information in the user attribute determined based on the image. For example, the human race of the avatar may be or may not be changed in accordance with the location information.

Figure 9B:
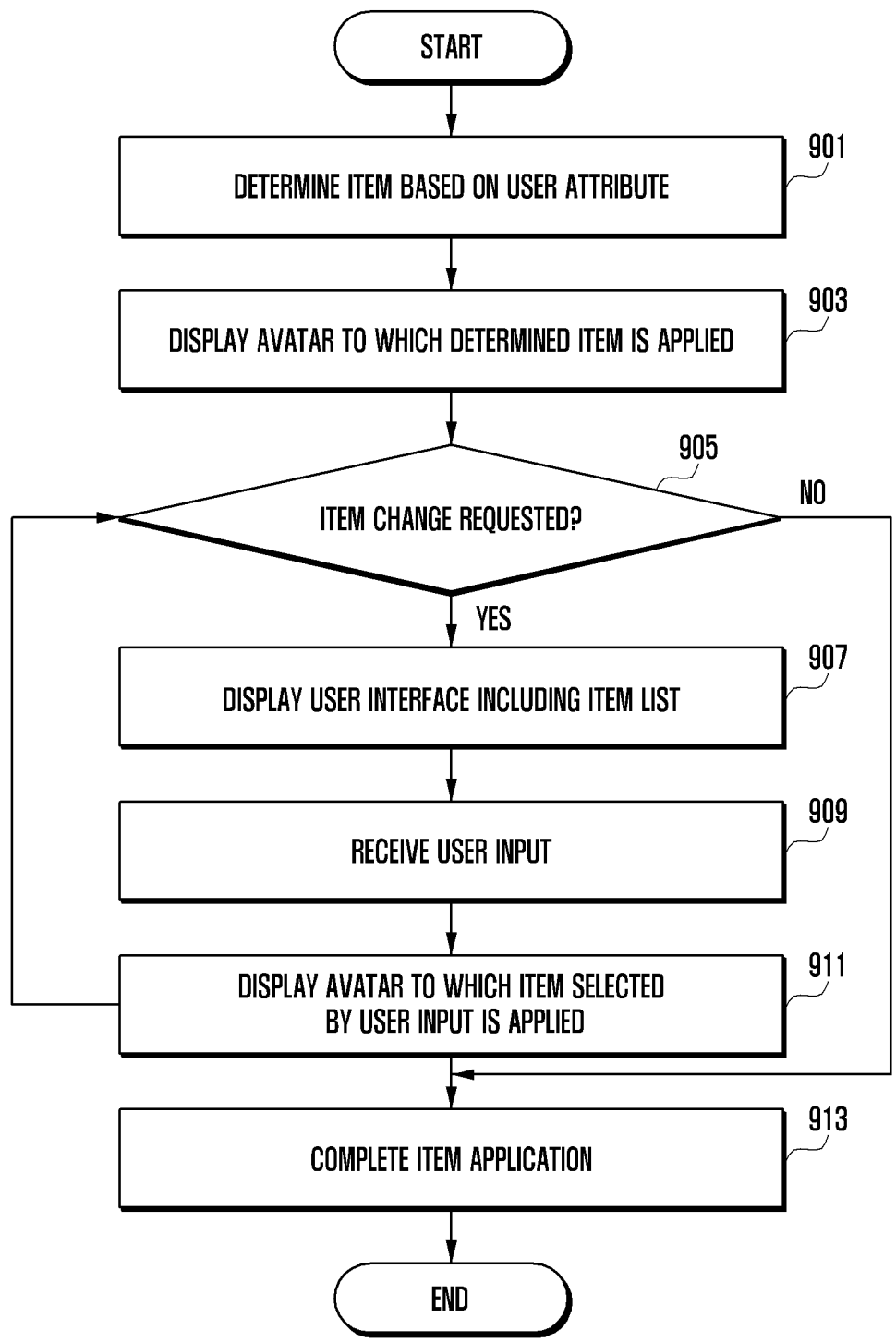
FIG. 9B is a flowchart illustrating an example method for changing an item according to various embodiments.

FIG. 9B is a flowchart illustrating an example method for changing an item according to various embodiments.

With reference to FIG. 9B, at operation 901, the processor (e.g., processor 120 of FIG. 1 or function processor 300 of FIG. 3) of the electronic device (e.g., electronic device 101 of FIG. 1) may determine an item based on the user attribute. The user attribute may include at least one of an age, a sex, a human race, or a region, and the item may include various types of objects additionally applicable to the avatar. If the user attribute is a male child in the 0s (e.g., 0 to 9 years), the processor 120 may determine yellowish or blueish shirt and pants oriented clothing items, and in the case of a female in her 30s, the processor 120 may determine blouse H-line skirt oriented clothing items. Further, if the region is China, the processor 120 may determine the "chipao" including a reddish or colorful pattern as the item, and it may determine a skirt-shaped chipao or pants-shaped chipao as the item depending on whether the user is a male or female.

At operation 903, the processor 120 may display the avatar to which the determined item is applied on the display (e.g., display device 106 of FIG. 1). For example, the avatar to which the item is applied may be the avatar as illustrated in FIGS. 7A to 7E. The user may identify the avatar, and it may determine whether to change the item.

At operation 905, the processor 120 may determine whether the item change has been requested. For example, at operation 903, the processor 120 may display a guide (e.g., item list) for the item change together with the avatar. If a selection input for at least one item included in the item list is received, or a scroll movement input is received on the item list, the processor 120 may determine that the item change has been requested. Further, the processor 120 may provide a separate button (e.g., identification button or change button) together with the avatar display. At operation 905, if the item change has been requested, the processor 120 may perform an operation 907, whereas if the item change has not been requested, the processor 120 may perform an operation 913.

If the item change has been requested, at operation 907, the processor 120 may display a user interface including the item list. The item list may be the same as or may be different from the item displayed together with the avatar at operation 903. The item list provided at operation 907 may include various kinds (e.g., hat, clothing, and accessory) of items. For example, the item list provided at operation 903 may be displayed on a partial region of the display device 106, and the item list provided at operation 907 may be displayed on the whole region of the display device 106.

At operation 909, the processor 1250 may receive the user input. The processor 120 may receive the user input for selecting at least one item.

At operation 911, the processor 120 may display the avatar to which the item selected through the user input is applied. For example, the item applied at operation 903 may be different from the item applied at operation 911. The user may identify the avatar displayed at operation 911, and it may determine whether to change the item.

If there is not item change request, at operation 913, the processor 120 may complete the operation of applying the item to the avatar. If the operation 913 is completed, the processor 120 may generate an emoji using the avatar to which the item is applied.

Figure 10:
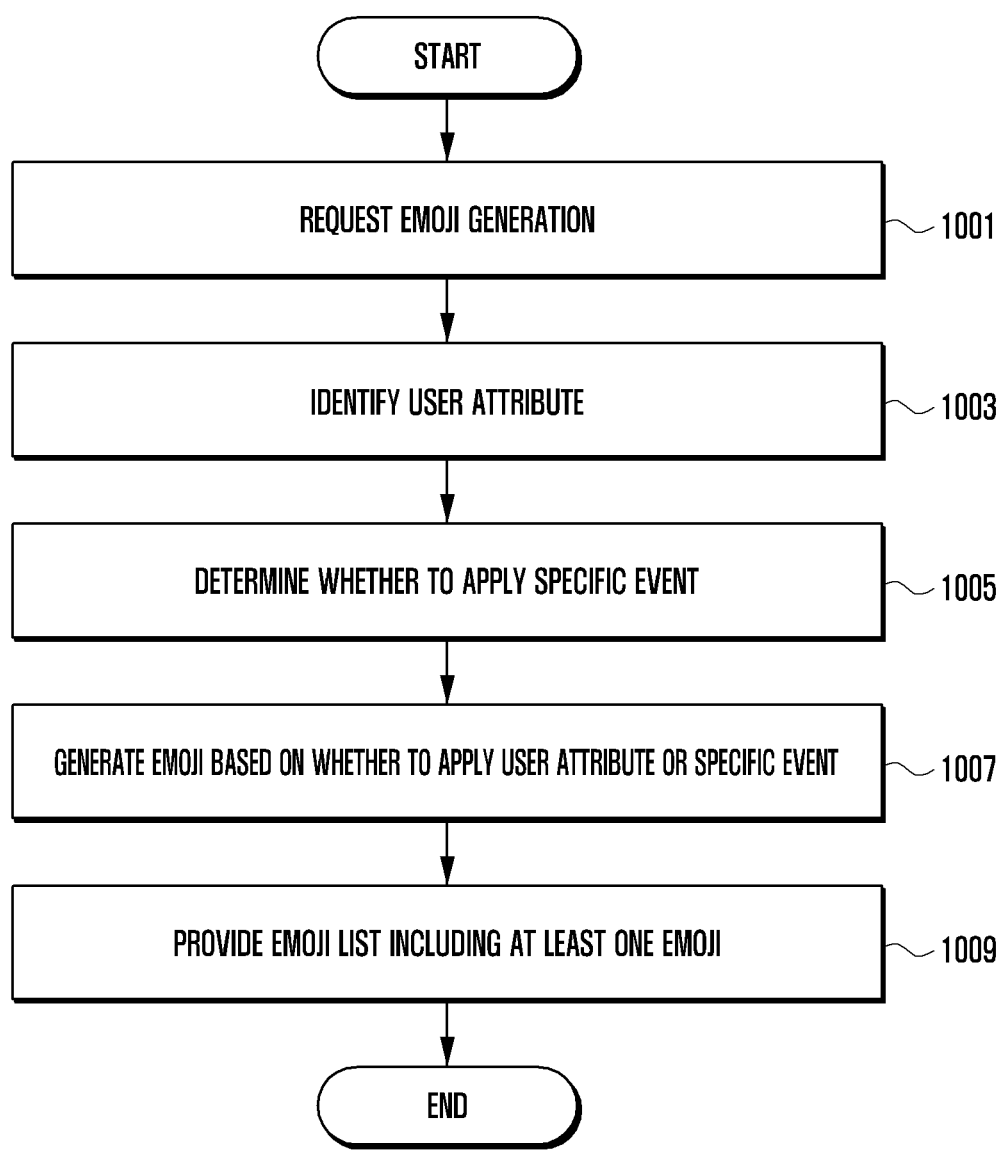
FIG. 10 is a flowchart illustrating an example method for generating an emoji based on an avatar according to various embodiments.

FIG. 10 is a flowchart illustrating an example method for generating an emoji based on an avatar according to various embodiments.

With reference to FIG. 10, at operation 1001, the processor (e.g., processor 120 of FIG. 1 or function processor 300 of FIG. 3) of the electronic device (e.g., electronic device 101 of FIG. 1) may be requested to generate an emoji. After completion of the operation 509 of FIG. 5 or the operation 913 of FIG. 9, the user may request the emoji generation. For this, the processor 120 may further provide an emoji generation request button when an item-applied avatar is displayed, and if the emoji generation request button is selected, the processor 120 may determine that the emoji generation has been requested.

At operation 1003, the processor 120 may identify the user attribute. Although the processor 120 has identified the user attribute during the avatar generation, the processor may further identify a separate user attribute for the emoji generation. For example, because the user can change the human race or the region during the avatar generation, the user may desire to generate the emoji using the original user attribute during the emoji generation. The processor 120 may identify the user attribute during the emoji generation in a similar manner to the avatar generation or the item generation, or it may change the user attribute based on the user input.

At operation 1005, the processor may determine whether to apply a specific event. For example, the processor 120 may determine whether the time when the emoji generation is requested corresponds to the specific event. The specific event may be a festival period in which the whole world can equally get pleasure, such as Olympics, World Cup, or Christmas, or it may be a festival period (e.g., beer festival or tomato festival) determined in each nation. The processor 120 may determine whether to apply the specific event based on the setting of the electronic device 101 or the user's selection.

At operation 1007, the processor 120 may generate the emoji based on whether the user attribute or the specific even is applied. The processor 120 may generate, as the emoji, an image in which an emotional expression (e.g., pleasure, happiness, annoyance, or gloom), an operation (e.g., acceptance, piece, or OK), a background (e.g., empty region excluding the avatar), or a text (e.g., simple learning indicating an emotion or operation) is added to the avatar based on whether to apply the user attribute or the specific event.

At operation 1009, the processor 120 may provide an emoji list including at least one emoji. The processor 120 may delete or correct any one of emojis included in the emoji list, or it may add a new emoji.

FIGS. 11, 12A, 12B and 13 are diagrams illustrating examples in which emojis are differently generated in accordance with the user attribute in accordance with various embodiments.

Figure 11:
FIG. 11 is a diagram illustrating an example in which an electronic device differently generates backgrounds of an emoji in accordance with ages and sexes according to various embodiments.
Figure 11:
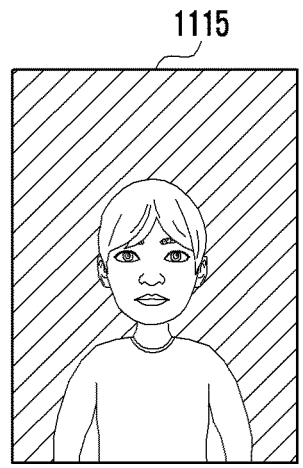
Figure 11:
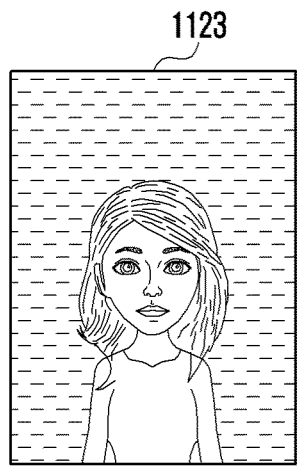
Figure 11:
Figure 11:
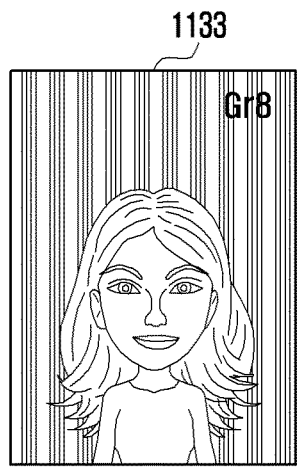
Figure 11:
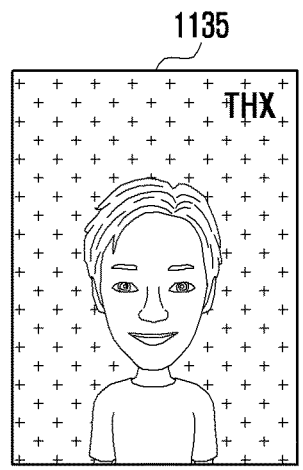

FIG. 11 is a diagram illustrating an example in which different backgrounds of emojis are generated in accordance with age and sex.

With reference to FIG. 11, the processor 120 may generate emojis of different backgrounds in accordance with the sex using a 10s-aged avatar 1110. For example, the processor 120 may generate an emoji 1113 including the first background with respect to a female avatar in her 10s, and it may generate an emoji 1115 including the second background with respect to a male avatar in his 10s. Further, the processor 120 may generate emojis of different backgrounds in accordance with the sex using a 30s-aged avatar 1120. The processor 120 may generate an emoji 1123 including the third background with respect to a female avatar in her 30s, and it may generate an emoji 1125 including the fourth background with respect to a male avatar in his 30s. Further, the processor 120 may generate emojis including different backgrounds and texts in accordance with the sex using an avatar 1130 for which the age is 10s and the human race is a white. The processor 120 may generate an emoji 1133 including the fifth background and text (e.g., Gr8) with respect to a white female avatar, and it may generate an emoji 1135 including the sixth background and text (e.g., THX) with respect to a white male avatar. The text is a language in online mainly used by the 10s, and "Gr8" may mean great and "THX" may mean thanks.

Figure 12A:
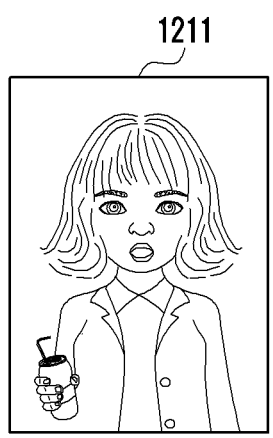
FIG. 12A is a diagram illustrating an example in which an electronic device differently generates emotional expressions of an emoji in accordance with ages and sexes according to various embodiments.
Figure 12A:
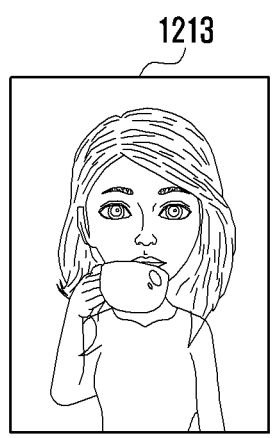
Figure 12A:
Figure 12A:
Figure 12A:
Figure 12A:
Figure 12B:
FIG. 12B is a diagram illustrating an example in which an electronic device differently generates emotional expressions of an emoji in accordance with ages and sexes according to various embodiments.
Figure 12B:
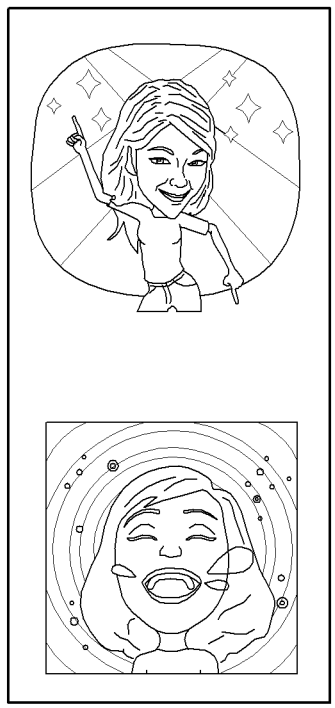
Figure 12B:
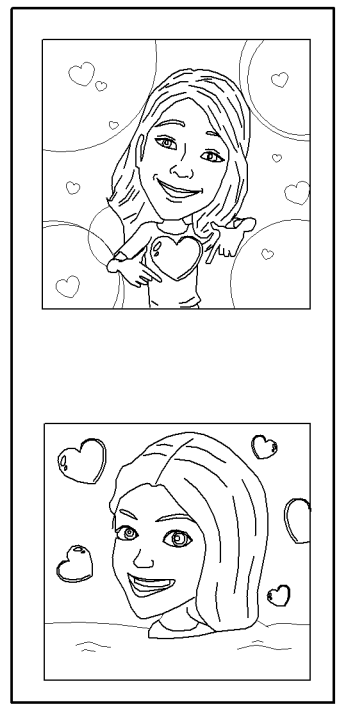

FIGS. 12A and 12B are diagrams illustrating examples in which emotional expression of emojis are differently generated in accordance with ages and sexes.

With reference to FIG. 12A, an example is illustrated, in which the processor 120 differently generates emojis in accordance with the ages or sexes with respect to a message or an expression "Let's have a drink" 1210. For example, the processor 120 may generate an emoji 1211 in which an avatar holds drinking water using a child avatar, generate an emoji 1213 in which an avatar takes a cup of coffee using a female avatar, and generate an emoji 1215 in which an avatar has a drink using a male avatar. Further, an example is illustrated, in which the processor 120 differently generates emojis in accordance with the ages or sexes with respect to the emotional expression "laugh" 1220. For example, the processor 120 may generate an emoji 1221 including the first text (e.g., "HaHaHa") with a laughing expression of 10s avatar, generate an emoji 1223 including the second text (e.g., "HoHoHo") with a laughing expression of 20s female avatar, and generate an emoji 1225 including the third text (e.g., "HaHaHa") with a laughing expression of 60s male avatar.

With reference to FIG. 12B, an example is illustrated, in which the processor 120 generates an emoji related to emotional expressions. For example, the processor 120 may generate a composure emoji 1230, a liveliness emoji 1240, and a love emoji 1250 using a female avatar in her 20s (or 30s). The composure emoji 1230 may express composure, the liveliness emoji 1240 may express liveliness, and the love emoji 1250 may show a love expression (or loveliness). The processor 120 may differently generates emotional expression emojis in accordance with at least one of the sex, age, human race, or region.

Figure 13:
FIG. 13 is a diagram illustrating an example in which an electronic device differently generates specific event period emoji according to various embodiments.
Figure 13:
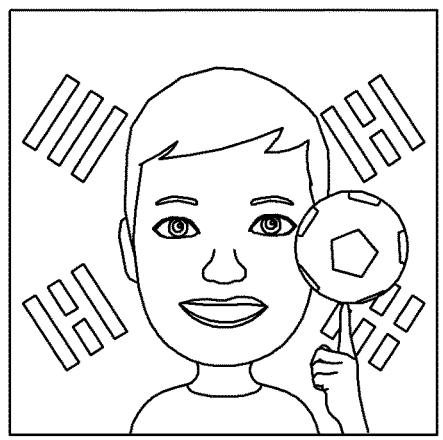
Figure 13:

FIG. 13 is a diagram illustrating an example in which specific event period emojis are differently generated.

With reference to FIG. 13, the processor 120 may generate an emoji considering where there is a user attribute or a specific event period. For example, if the emoji generation time corresponds to a specific event period (e.g., season, or sports festival (e.g., Olympics or World Cup)), the processor 120 may generate the emoji that can be used only in the specific event period. The processor 120 may generate the first World Cup emoji 1310, the second World Cup emoji 1320, and the third World Cup emoji 1330 using a male avatar in consideration of the World Cup period.

A method for operating an electronic device according to various embodiments may include acquiring an image of a user of the electronic device using a camera included in the electronic device; generating an avatar corresponding to the user using the image; identifying attribute information corresponding to the avatar using the image; identifying at least one item corresponding to the attribute information among a plurality of items applicable to the avatar; and displaying the at least one item with the avatar through a display of the electronic device.

Displaying may include applying the item selected from the at least one item to the avatar and providing the selected item with the avatar through the display.

The attribute information may include at least one of a human race, a sex, an age, or a region, and identifying the at least one item may include identifying the at least one item corresponding to the human race, the sex, the age, or the region.

Generating the avatar may include differently generating at least one of a face size or shape corresponding to the avatar, an eye size or color, a skin color, a hair color, or a hair style based on the attribute information.

The item may include at least one of a clothing, a hat, or an accessory, and Identifying the at least one item may include identifying the at least one item corresponding to the clothing, the hat, or the accessory.

Determining the item may include differently applying a clothing item to the avatar in accordance with the region of the attribute information.

The method may further include generating an emoji to which at least one of a designated emotional expression, an operation, a background, or a text is applied using the avatar to which the at least one item is applied.

While the disclosure has been illustrated and described with reference to various example embodiments thereof, it will be understood that the various example embodiments are intended to be illustrative, not limiting, and that various changes in form and details may be made without departing from the true spirit and full scope of the disclosure as may be defined, for example, by the appended claims and their equivalents.

What is claimed is:

1. An electronic device comprising:
a camera;
a display; and
a processor,
wherein the processor is configured to control the electronic device to:
acquire an image of a user of the electronic device using the camera,
generate an avatar corresponding to the user based on the image,
identify an age, a sex, and a race of the user included in attribute information corresponding to the avatar by analyzing face feature points from the image,
determine a geographical region included in the attribute information corresponding to the avatar based on regional information pre-set in the electronic device,
change the determined geographical region corresponding to the avatar based on the race of the user identified from the image,
determine whether the changed geographical region is different from current location information of the electronic device,
if the changed geographical region is different from the current location information of the electronic device, re-change the changed geographical region included in the attribute information corresponding to the avatar in accordance with the current location information,
identify at least one item corresponding to the attribute information among a plurality of items applicable to the avatar,
identify, for each of the identified at least one item, item attributes, wherein identifying the item attributes includes determining an item type based on the sex of the user and the re-changed geographical region included in the attribute information, and an item color based on the sex of the user included in the attribute information, and
display the at least one identified item including the identified item attributes with the avatar through the display, wherein the at least one item is differently applied to the avatar in accordance with at least one of the re-changed geographical region, the age, the race, and the sex of the user, and
generate an emoji based on the avatar, wherein the emoji includes an image in which at least one of an emotional expression, an operation, a background, or a text is added using the avatar.

2. The electronic device of claim 1, wherein identifying the item attributes includes determining a shape of the at least one identified item corresponding to the location information and the sex of the user.

3. The electronic device of claim 1, wherein the processor is configured to control the electronic device to adjust at least one setting of a face size or shape corresponding to the avatar, an eye size or color, a skin color, a hair color, or a hair style based on the attribute information.

4. The electronic device of claim 1, wherein the item includes at least one of a clothing, a hat, or an accessary, and the processor is configured to control the electronic device to identify the at least one item corresponding to the clothing, the hat, or the accessary.

5. The electronic device of claim 1, wherein the processor is configured to control the electronic device to differently apply the clothing a clothing item to the avatar based on the geographical region of the attribute information.

6. A method for operating an electronic device, comprising:
acquiring an image of a user of the electronic device using a camera included in the electronic device;
generating an avatar corresponding to the user using the image;
identifying an age, a race and sex of the user, wherein the geographical region is identified based on the race of the user; an age, a sex, and a race of the user included in attribute information corresponding to the avatar by analyzing face feature points from the image,
determining a geographical region included in the attribute information corresponding to the avatar based on regional information pre-set in the electronic device,
changing the determined geographical region corresponding to the avatar based on the race of the user identified from the image,
determining whether the changed geographical region is different from current location information of the electronic device;
if the changed geographical region is different from the current location information of the electronic device, re-changing the changed geographical region included in the attribute information corresponding to the avatar in accordance with the current location information of the electronic device;
identifying at least one item corresponding to the attribute information among a plurality of items applicable to the avatar;
identifying, for each of the identified at least one item, item attributes, wherein identifying the item attributes includes determining an item type based on the sex of the user and the re-changed geographical region included in the attribute information, and an item color based on the sex of the user included in the attribute information;
displaying the at least one identified item including the identified item attributes with the avatar through a display of the electronic device, wherein the at least one item is differently applied to the avatar in accordance with at least one of the location information, the age, the race, and the sex of the user, and
generating an emoji based on the avatar, wherein the emoji includes an image in which at least one of an emotional expression, an operation, a background, or a text is added using the avatar.

7. The method of claim 6, wherein identifying the item attributes includes determining a shape of the at least one identified item corresponding to the location information and the sex of the user.

8. The method of claim 6, wherein generating the avatar comprises differently generating at least one of a face size or shape corresponding to the avatar, an eye size or color, a skin color, a hair color, or a hair style based on the attribute information.

9. The method of claim 6, wherein the item includes at least one of a clothing, a hat, or an accessary, and
identifying the at least one item comprises identifying the at least one item corresponding to the clothing, the hat, or the accessary.

10. The method of claim 6, wherein determining the item comprises differently applying a clothing item to the avatar based on the geographical region of the attribute information.

11. An electronic device comprising:
a display; and
a processor,
wherein the processor is configured to control the electronic device to:
identify an age, a sex, and a race of a user included in a user attribute by analyzing face feature points from an image including the user,
determine location information included in the user attribute based on regional information pre-set in the electronic device,
change the determined location information based on the race of the user identified from the image,
determine whether the changed location information is different from current location information of the electronic device,
if the changed location information is different from the current location information of the electronic device, re-change the changed location information included in the user attribute corresponding to an avatar in accordance with the current location information,
generate the avatar based on the user attribute and display the generated avatar through the display,
determine at least one item to be applied to the avatar based on the user attribute,
determine, for each of the determined at least one item, item attributes, wherein determining the item attributes includes determining an item type based on the sex of the user and the re-changed location information included in the user attribute, and item color based on the sex of the user included in the user attribute, and
display the avatar to which the at least one determined item including the determined item attributes is applied through the display, wherein the at least one item is differently applied to the avatar in accordance with at least one of the location information, the age, the sex, and the race of the user, and
generate an emoji based on the avatar, wherein the emoji includes an image in which at least one of an emotional expression, an operation, a background, or a text is added using the avatar.

12. The electronic device of claim 11, wherein the processor is configured to control the electronic device to:
receive an input for changing the user attribute,
display a user interface for changing the user attribute on the display,
change the user attribute based on an input on the user interface, and
change the avatar based on the changed user attribute.

13. The electronic device of claim 11, wherein the processor is configured to control the electronic device to apply a clothing item indicating regional characteristics to the avatar in accordance with the location information.

* * * * *